United States Patent
Kadowaki et al.

(10) Patent No.: US 8,238,319 B2
(45) Date of Patent: Aug. 7, 2012

(54) RADIO APPARATUS

(75) Inventors: Naoto Kadowaki, Kyoto (JP); Peter Davis, Kyoto (JP); Jun Hasegawa, Kyoto (JP); Akio Hasegawa, Kyoto (JP); Sadao Obana, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 937 days.

(21) Appl. No.: 11/896,170

(22) Filed: Aug. 30, 2007

(65) Prior Publication Data
US 2008/0062901 A1 Mar. 13, 2008

Related U.S. Application Data

(60) Provisional application No. 60/841,513, filed on Sep. 1, 2006.

(51) Int. Cl.
*H04B 7/216* (2006.01)
(52) U.S. Cl. .......... 370/342; 370/335; 370/345
(58) Field of Classification Search .......... None
See application file for complete search history.

(56) References Cited

U.S. PATENT DOCUMENTS

| | | | |
|---|---|---|---|
| 6,490,292 B1 | 12/2002 | Matsuzawa | |
| 2002/0075941 A1* | 6/2002 | Souissi et al. | 375/133 |
| 2003/0016696 A1* | 1/2003 | Peterson | 370/466 |
| 2003/0063607 A1 | 4/2003 | Adachi et al. | |
| 2003/0067929 A1 | 4/2003 | Matsuzawa | |
| 2003/0117905 A1* | 6/2003 | Tsutsui et al. | 369/13.05 |
| 2004/0032354 A1* | 2/2004 | Knobel et al. | 341/133 |
| 2004/0085966 A1* | 5/2004 | Gotoh et al. | 370/395.31 |
| 2004/0097253 A1* | 5/2004 | Malkamaki | 455/522 |
| 2004/0114549 A1 | 6/2004 | Miyoshi | |
| 2004/0258098 A1 | 12/2004 | Ohkubo et al. | |
| 2005/0018679 A1 | 1/2005 | Iwami | |
| 2005/0085190 A1 | 4/2005 | Nishikawa | |
| 2006/0025136 A1* | 2/2006 | Fujita et al. | 455/436 |
| 2007/0063881 A1* | 3/2007 | Kahlman et al. | 341/143 |
| 2007/0110102 A1* | 5/2007 | Yagyuu et al. | 370/470 |
| 2008/0095095 A1 | 4/2008 | Adachi et al. | |

FOREIGN PATENT DOCUMENTS

| | | |
|---|---|---|
| EP | 1 443 682 A2 | 8/2004 |
| EP | 1 467 509 A1 | 10/2004 |
| EP | 2 224 612 A1 | 9/2010 |
| JP | 07-288865 | 4/1994 |
| JP | 11-261641 | 9/1999 |

(Continued)

OTHER PUBLICATIONS

Chelius et al. (Ananas: "A New Adhoc Network Architectural Scheme", Jan. 2002.*
Komaki, S., et al., "Wireless Technique and its Applications 3 Wireless LAN and Ubiquitous Network", 2004, Maruzen Kabushiki Kaisha.
Japanese Office Action, with English translation, issued in Japanese Patent Application No. 2005-147814, mailed Sep. 7, 2010.

(Continued)

*Primary Examiner* — Jianye Wu
(74) *Attorney, Agent, or Firm* — McDermott Will & Emery LLP

(57) ABSTRACT

Radio apparatuses each has a plurality of channels and, when data is to be transmitted, selects a specific channel having relatively low signal interference from the plurality of channels. Each radio apparatus spreads transmission data with a prescribed spread code arbitrarily selected from a plurality of spread codes, and modulates the spread spectrum signal with the frequency of the specific channel to transmit. As a result, delay in an autonomously established wireless network can be reduced.

11 Claims, 14 Drawing Sheets

FOREIGN PATENT DOCUMENTS

| | | |
|---|---|---|
| JP | 2000-059286 | 2/2000 |
| JP | 2000-197112 | 7/2000 |
| JP | 2004-208074 | 12/2002 |
| JP | 2003-008591 | 1/2003 |
| JP | 2003-069600 | 3/2003 |
| JP | 2003-174452 | 6/2003 |
| JP | 2003-218830 | 7/2003 |
| JP | 2003-348046 | 12/2003 |
| JP | 2004-503170 | 1/2004 |
| JP | 2004-254304 | 9/2004 |
| JP | 2005-012710 | 1/2005 |
| JP | 2005-065155 | 3/2005 |
| JP | 2005-86408 | 3/2005 |
| WO | WO02/05441 A2 | 1/2002 |

OTHER PUBLICATIONS

Japanese Notification of Reasons for Refusal, with English translation, issued in Japanese Patent Application No. 2005-147752, dated Nov. 2, 2010.

Japanese Notification of Reasons for Refusal, w/ English translation thereof, issued in Japanese Patent Application No. JP 2005-147752 dated May 24, 2011.

Decision for Final Refusal isued for Japanese Patent Application No. 2005-147752, dated Aug. 30, 2011.

Decision for Dismissal o f Amendment issued for Japanese Patent Application No. 2005-147752, dated Aug. 30, 2011.

* cited by examiner

Fig. 5

CLT

| LABEL | COMMAND |
|---|---|
| [1]/[1100110]/[ARBITRARY NUMERICAL VALUE]<br>[0]/[1111011]/[0000] | Com1 |
| [0]/[NUMERICAL VALUE DIFFERENT FROM PAST NUMERICAL VALUE]/[NUMERICAL VALUE OTHER THAN 0] | Com2 |
| [1]/[1100110]/[NUMERICAL VALUE OTHER THAN 0] | Com3 |
| LABEL ERROR<br>[0]/[NUMERICAL VALUE SAME AS PAST NUMERICAL VALUE]/[NUMERICAL VALUE OTHER THAN 0] | Com4 |

RADIO APPARATUS

CROSS-REFERENCE TO RELATED APPLICATIONS

This application is entitled to the benefit of Provisional Patent application No. 60/841,513, filed Sep. 1, 2006.

BACKGROUND OF THE INVENTION

1. Field of the Invention

The present invention relates to a radio apparatus and, specifically, to a radio apparatus as one of a plurality of radio apparatuses constructing an ad-hoc network in an autonomous and instantaneous manner.

2. Description of the Related Art

An ad-hoc network is a network constructed in an autonomous and instantaneous manner by a plurality of radio apparatuses communicating with each other. In the ad-hoc network, when two radio apparatuses to communicate with each other do not exist in a mutual communication area, a radio apparatus located at an intermediate position between the two radio apparatuses functions as a router and relays a data packet, whereby a wide area multi-hop network can be formed.

Applications of the ad-hoc network as such are expected in various fields, including wireless communication network at a disaster site and streaming in vehicle-to-vehicle communication in ITS (Intelligent Transport Systems) (Shozo Komaki (Ed.), "Wireless LAN and Ubiquitous Network", Maruzen Kabushiki Kaisha, 2004).

Dynamic routing protocols supporting multi-hop communication include table-driven type protocols and on-demand type protocols. According to the table-driven type protocol, control information related to routes is exchanged on a regular basis, and a route table is formed in advance. FSR (Fisheye State Routing), OLSR (Optimized Link State Routing) and TBRPF (Topology dissemination Based on Reverse-Path Forwarding) are known examples.

According to the on-demand type protocol, a path to an address is formed for the first time when a data transmission request is generated. DSR (Dynamic Source Routing) and AODV (Ad Hoc On-Demand Distance Vector Routing) are known examples.

In the conventional ad-hoc network, for a data communication from a source to a destination, a communication path is determined such that the hop number from the source to the destination is made as small as possible (Shozo Komaki (Ed.), Wireless LAN and Ubiquitous Network, Maruzen Kabushiki Kaisha, 2004).

The current ad-hoc network, however, does not allow simultaneous transmission/reception of packets using the same frequency channel. Further, it is not possible, either, to set up a network across different frequency channels.

As a result, while a radio apparatus in an ad-hoc network is receiving packets, the radio apparatus and neighboring radio apparatuses cannot transmit packets at the same time.

Therefore, when there are a plurality of data flows in multi-hop transmission, it follows that transfer delay derived from waiting accumulates at every relay, eventually resulting in a considerably large delay, and the delay of the ad-hoc network undesirably increases.

Further, in the current ad-hoc network, it is not expected that the route is always maintained in a stable manner, and therefore, a route search is performed on a regular basis or on-demand, to update a route selection table. Accordingly, the routing process is accomplished as a software process by Layer 3, which tends to cause process delay.

Further, when we consider flooding in which packets are transmitted to an unspecified number of radio apparatuses in the ad-hoc network, an identifying process is necessary to avoid duplicate packet transmission, and such identifying process also causes process delay.

BRIEF SUMMARY OF THE INVENTION

In view of the foregoing, the present invention was made to solve the above-described problems, and its object is to provide a radio apparatus that can reduce delay in a wireless network established in an autonomous manner.

The present invention provides a radio apparatus constructing a wireless network established autonomously and performing wireless communication between a source and a destination, including first packet processing means and/or second packet processing means. The first packet processing means spreads a packet with a prescribed spread code arbitrarily selected from a plurality of spread codes, and transmits the spread packet by one channel arbitrarily selected from a plurality of channels. The second packet processing means makes reference only to a header of a transmitted packet in order to receive and/or relay the packet.

Preferably, the first packet processing means includes spreading means, channel selecting means, and transmitting means. The spreading means spreads the packet with the prescribed spread code arbitrarily selected from the plurality of spread codes. The channel selecting means selects one channel from the plurality of channels, in response to a request for transmitting the packet. The transmitting means transmits a spread spectrum signal spread by the spreading means, using the one channel.

Preferably, the spreading means spreads the packet with a different spread code, every time a new transmission of the packet occurs.

Preferably, the channel selecting means selects a specific channel having relatively low signal interference as the one channel from the plurality of channels. The transmitting means transmits the spread spectrum signal using the specific channel.

Preferably, the channel selecting means performs Fast Fourier Transform on each signal of the plurality of channels, and selects a channel used for wireless communication of a signal having relatively low signal level among the plurality of signals subjected to Fast Fourier Transform as the one channel.

Preferably, the second packet processing means includes processing contents determining means, and processing means. The processing contents determining means determines, referring only to the header of the transmitted packet, which of a first process in which the packet is received, a second process in which the packet is relayed along a communication path between the source and the destination, and a third process in which the packet is relayed to an unspecified number of radio apparatuses, is to be performed. The processing means performs any of the first to third processes, in accordance with the result of determination by the processing contents determining means.

Preferably, the processing contents determining means is provided in a layer lower than the network layer.

Preferably, the radio apparatus further includes holding means. The capacity of the holding means is a data length longer by a predetermined length than the packet's header length, with the holding means temporarily holding, and then outputting to the processing means, a packet, with length, beginning from the packet head, equal to the said data length.

The processing contents determining means determines contents of processing of the packet with reference to a label stored in the header, while the header is held in the holding means.

Preferably, the prescribed length is varied in accordance with the method of modulating the packet.

Preferably, the label includes first or second bit patterns. The processing contents determining means determines to perform either the first process or the second process in accordance with a relation between the radio apparatus and the destination when the label includes the first bit pattern, and determines to perform the third process when the label includes the second bit pattern.

Preferably, the processing contents determining means determines to perform the first processing when the radio apparatus is the destination and the label includes the first bit pattern, and determines to perform the second process when the radio apparatus is a radio apparatus on the communication path and the label includes the first bit pattern.

Preferably, the first bit pattern has a first bit sequence indicating wireless communication of the packet along the communication path and a second bit sequence provided continuous to the first bit sequence. The second bit pattern has a third bit sequence having the same bit length as the first bit sequence and indicating wireless communication of the packet to a plurality of radio apparatuses in the wireless network, and a fourth bit sequence provided continuous to the third bit sequence and having the same bit length as the second bit sequence. The processing contents determining means determines to perform the third process when the label includes the second bit pattern, and a numerical value represented by the fourth bit sequence is larger than a numerical value used in the past.

Preferably, the first bit pattern is set when the communication path is determined. The second bit pattern is set by the source.

The radio apparatus in accordance with the present invention determines contents of packet processing by making reference only to a header of the packet transmitted from another radio apparatus, and processes the packet in accordance with the determined contents of processing, before reception of the whole packet is completed. Further, in the radio apparatus, the contents of packet processing are determined in a layer lower than the network layer.

Therefore, according to the present invention, communication delay experienced by each radio apparatus can be reduced. As a result, by constructing a wireless network using the radio apparatuses of the present invention, a wireless network with small communication delay can be realized.

Further, in the radio apparatus in accordance with the present invention, transmission data is spread by applying spread spectrum, with a prescribed spread code arbitrarily selected from a plurality of spread codes, and the spread spectrum signal is transmitted/received using one channel selected from a plurality of channels. As a result, simultaneous transmission/reception of signals by a plurality of neighboring radio apparatuses becomes possible.

Therefore, according to the present invention, communication delay experienced by each radio apparatus can be reduced.

Further, in the radio apparatus in accordance with the present invention, the spread spectrum signal thus spread is transmitted/received using a specific channel selected from a plurality of channels and having a relatively low signal interference. As a result, simultaneous transmission/reception of signals by a plurality of neighboring radio apparatuses becomes possible.

Therefore, according to the present invention, communication delay experienced by each radio apparatus can further be reduced.

Further, the radio apparatus in accordance with the present invention makes use of the spread spectrum technique and packet communication using a specific channel, and in addition, determines contents of packet processing by making reference only to the header of the packet transmitted from another radio apparatus, and processes the packet in accordance with the determined contents of processing.

Therefore, according to the present invention, communication delay experienced by each radio apparatus can further be reduced.

BRIEF DESCRIPTION OF THE SEVERAL VIEWS OF THE DRAWING

FIG. 5 shows a configuration of the control table held by the identifier shown in FIG. 3.

DETAILED DESCRIPTION OF THE INVENTION

Figure 1:
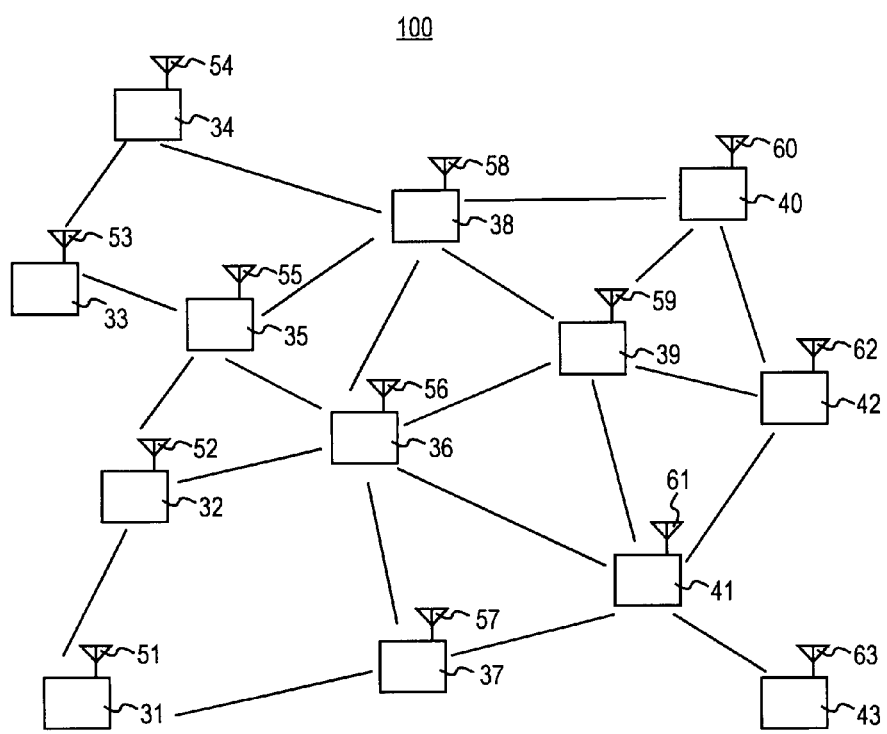
FIG. 1 is a schematic diagram showing a wireless network system using the radio apparatus in accordance with an embodiment of the present invention.

Embodiments of the present invention will be described in detail with reference to the figures. In the figures, the same or corresponding portions are denoted by the same reference characters and description thereof will not be repeated.

FIG. 1 is a schematic diagram of a wireless network system using the radio apparatus in accordance with an embodiment of the present invention. A wireless network system 100 includes radio apparatuses 31 to 43. The radio apparatuses 31 to 43 are arranged in a wireless communication space, and form a network in an autonomous manner. Antennas 51 to 63 are attached to the radio apparatuses 31 to 43, respectively.

By way of example, when data is to be transmitted from the radio apparatus 31 to the radio apparatus 42, the radio apparatuses 32, 35 to 41 relay and transmit the data from the radio apparatus 31 to the radio apparatus 42.

When data is to be transmitted from the radio apparatus 33 to the radio apparatus 43, the radio apparatuses 31, 32, 35 to 42 relay and transmit the data from the radio apparatus 33 to the radio apparatus 43.

As described above, in the wireless network system 100, a plurality of data flows may generate. In such a case, the radio apparatuses 32, 35 to 41 that relay two data flows described above (data flow from the radio apparatus 31 to the radio apparatus 42, and data flow from the radio apparatus 33 to the radio apparatus 43) cannot simultaneously relay two data flows at the same frequency, and therefore, until after the end of relaying the first data flow, the other data flow cannot be relayed. This results in delay in relaying the other data flow, and generation of such delay in relaying among the radio apparatuses 32, 35 to 41 increases delay in the wireless network system 100 as a whole.

Therefore, in the following, a method of wireless communication reducing delay in the entire wireless network system 100 will be described.

Here, as an example of the protocol for establishing a communication path between a source and a destination, OLSR protocol is used. The OLSR protocol is a table-driven type routing protocol, in which path information is exchanged using a Hello message and a TC (Topology Control) message, for forming a routing table.

In the following, description will be given on the assumption that a wireless communication path has been established between the source and the destination in accordance with the OLSR protocol and the environment allowing wireless communication between the source and the destination is ready.

Embodiment 1

Figure 2:
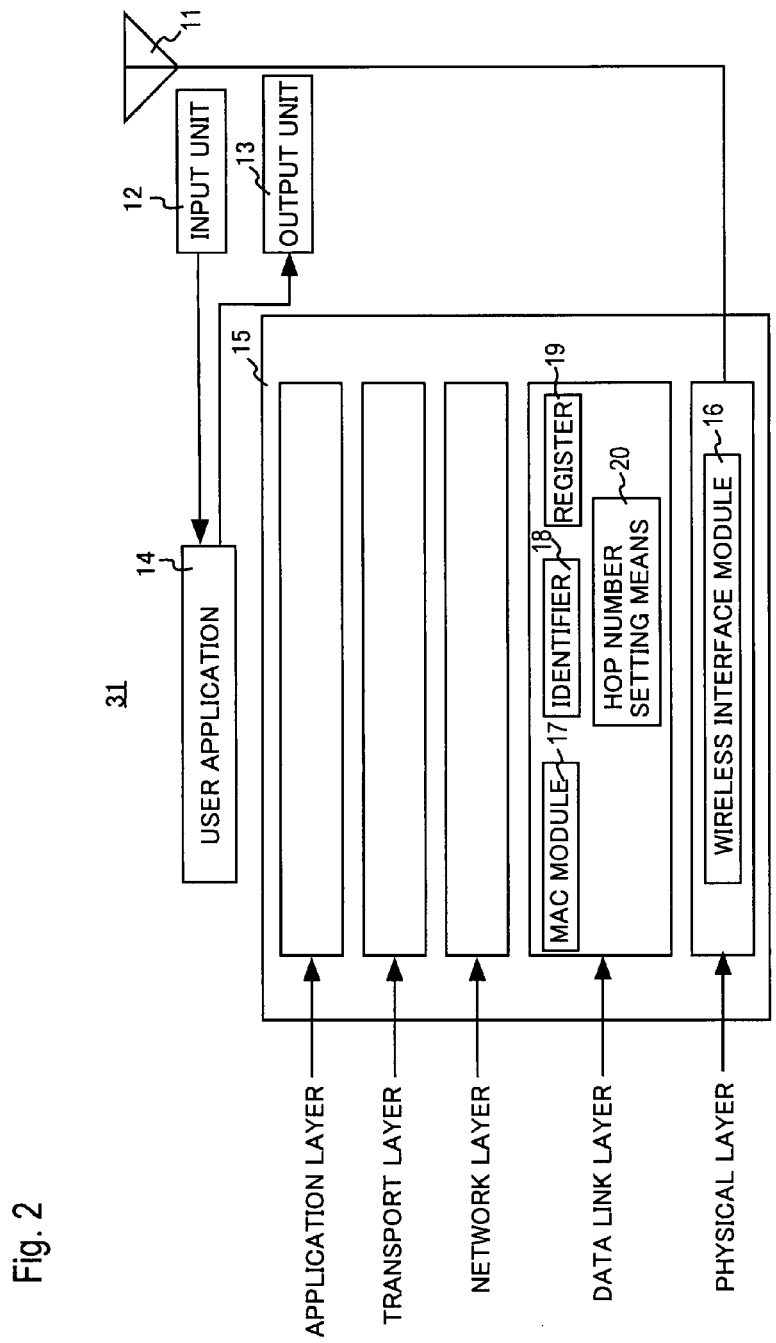
FIG. 2 is a schematic block diagram showing a configuration in accordance with Embodiment 1 of the radio apparatus shown in FIG. 1.

FIG. 2 is a schematic block diagram showing a configuration in accordance with Embodiment 1 of the radio apparatus 31 shown in FIG. 1. The radio apparatus 31 includes an antenna 11, an input unit 12, an output unit 13, a user application 14 and a communication control unit 15.

The antenna 11 represents each of antennas 51 to 63 shown in FIG. 1. The antenna 11 receives data from another radio apparatus through the wireless communication space, outputs the received data to the communication control unit 15, and transmits data from the communication control unit 15 to another radio apparatus through the wireless communication space.

The input unit 12 receives an address to which the data is to be sent and a message input by an operator of the radio apparatus 31, and outputs the received message and the address to the user application 14. The output unit 13 displays the message under control of the user application 14.

The user application 14 generates data based on the message and the address from the input unit 12, and outputs the same to the communication control unit 15.

The communication control unit 15 consists of a plurality of modules performing communication control in accordance with ARPA (Advanced Research Projects Agency) Internet hierarchical structure. Specifically, the communication control unit 15 includes a wireless interface module 16, a MAC (Media Access Control) module 17, an identifier 18, a register 19, a hop number setting means 20, and a module (not shown) provided for upper layers such as the network layer.

The wireless interface module 16 belongs to the physical layer. The wireless interface module 16 spreads transmission data with a prescribed spread code, modulates the spread transmission data with a prescribed frequency, and transmits the data through the antenna 11.

Further, the wireless the interface module 16 receives a signal transmitted from another radio apparatus through the antenna 11, demodulates the received signal, despreads the demodulated signal and outputs the result to the register 19 or to an upper layer such as the network layer.

The MAC module 17 belongs to the data link layer, and executes MAC protocol, to execute various functions as will be described in the following.

Specifically, the MAC module 17 broadcasts a Hello packet received from the upper layer, through the wireless interface module 16.

Further, the MAC module 17 controls re-transmission of data (packet).

The identifier 18 belongs to the data link layer and, in accordance with a method described later, determines a destination of a packet PKT referring only to a header of the packet PKT held by the register 19. The identifier 18 generates a control signal CTL for controlling the wireless interface module 16 such that the packet PKT is transmitted to the determined destination, and outputs the generated signal to the wireless interface module 16.

The register 19 belongs to the data link layer, and it temporarily holds the packet PKT received from the wireless interface module 16 and outputs the same to the hop number setting means 20.

The hop number setting means 20 decrements a hop counter included in the header of packet PKT output from the register 19 by "1", and outputs the packet PKT to the wireless interface module 16.

Each of the radio apparatuses 32 to 43 shown in FIG. 1 has the same configuration as that of the radio apparatus 31 shown in FIG. 2.

Figure 3:
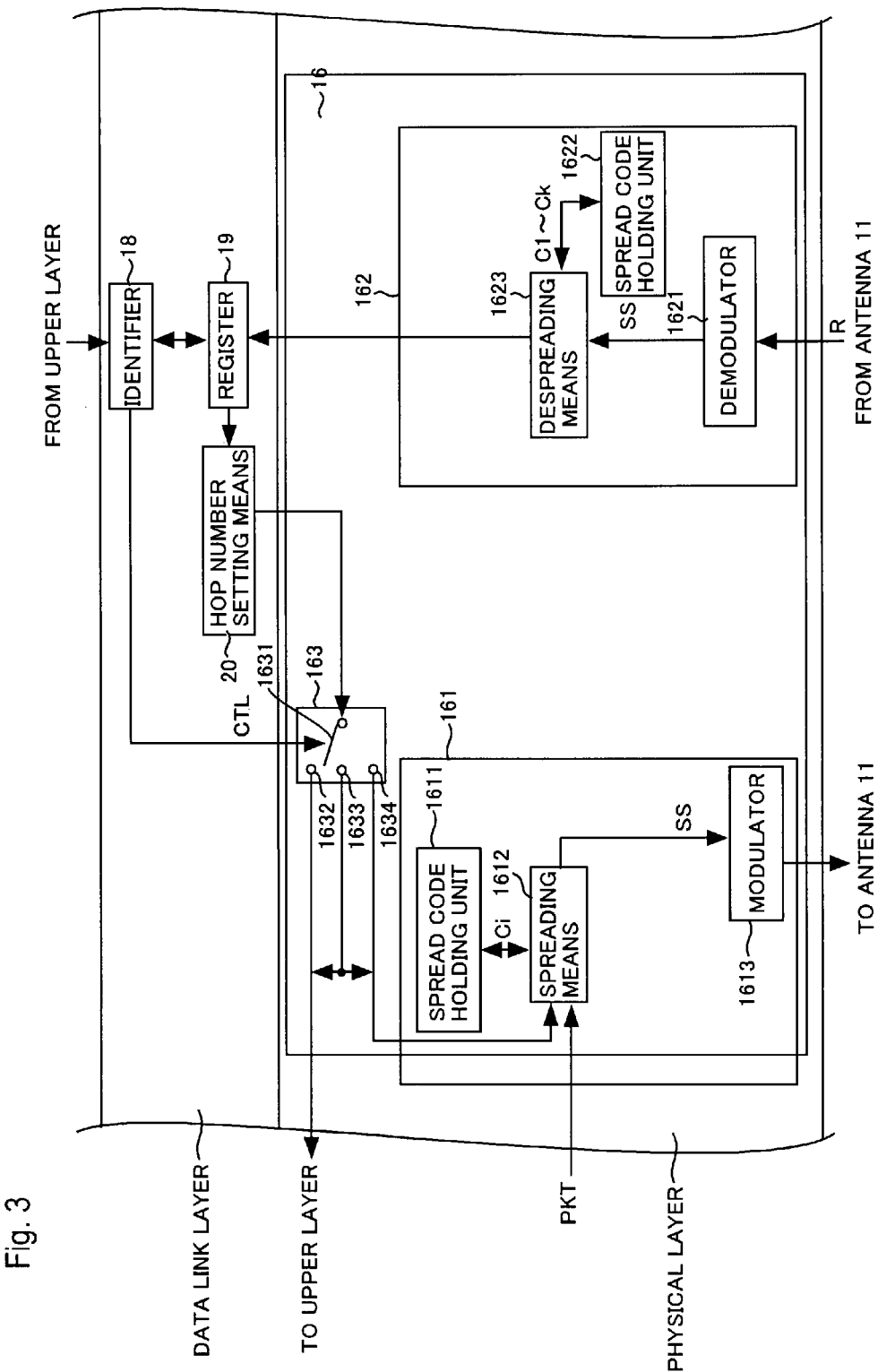
FIG. 3 shows a configuration of a part of the wireless interface module shown in FIG. 2.

FIG. 3 shows a configuration of a part of the wireless interface module 16 shown in FIG. 2. The wireless interface module 16 includes a transmitting unit 161, a receiving unit 162, and a switching unit 163.

The transmission unit 161 includes a spread code holding unit 1611, spreading means 1612, and a modulator 1613. The spread code holding unit 1611 holds a plurality of spread codes C1 to Ck (k is an integer not smaller than 2). The plurality of spread codes C1 to Ck consist of mutually different code sequences.

More specifically, the plurality of spread codes C1 to Ck consist of code sequences having sharp autocorrelation when phase difference is zero and sufficiently small correlation when the phase difference is not zero. The plurality of spread codes C1 to Ck are formed of such code sequences in order that even when signals spread by the spread spectrum in the wireless network system 100 are subjected to asynchronous wireless communication, each radio apparatus can extract only the desired wave through despreading.

Upon reception of a request for outputting a spread code Ci ($i$ is an integer satisfying $1 \leq i \leq k$) from the spreading means 1612, the spread code holding unit 1611 outputs the spread code Ci to the spreading means 1612. Here, every time the spread code holding unit 1611 receives the request for outputting spread code Ci, it selects a spread code different from that output last time to the spreading means 1612, from the plurality of spread codes C1 to Ck, and outputs the selected code to the spreading means 1612.

The spreading means 1612 receives the packet PKT from the MAC module 17 or from the switching unit 163, and receives the spread code Ci from the spread code holding unit 1611. Then, the spreading means 1612 spreads the packet PKT with spread code Ci. More specifically, the spreading means 1612 operates an exclusive OR between the bit sequence of the packet PKT and the spread code Ci, so that the packet PKT is spread with spread code Ci.

The spreading means 1612 outputs the spread spectrum signal SS, generated by spreading the packet PKT, to the modulator 1613.

Receiving the spread spectrum signal SS from the spreading means 1612, the modulator 1613 modulates the spread spectrum signal SS with a prescribed frequency, and outputs the modulated spread spectrum signal SS to the antenna 11.

The receiving unit 162 includes a demodulator 1621, a spread code holding unit 1622, and a despreading unit 1623.

The demodulator 1621 receives a reception signal R from the antenna 11, demodulates the received reception signal R with a prescribed frequency, and outputs the spread spectrum signal SS to the despreading means 1623.

The spread code holding unit 1622 holds the plurality of spread codes C1 to Ck, which are the same as those held by the spread code holding unit 1611 of the transmitting unit 161. Receiving a request for outputting a spread code from the despreading means 1623, the spread code holding unit 1622 outputs the plurality of spread codes C1 to Ck to the despreading means 1623.

The despreading means 1623 receives the spread spectrum signal SS from the demodulator 1621, and receives the plurality of spread codes C1 to Ck from the spread code holding unit 1622. The despreading means 1623 calculates correlation values between the spread spectrum signal SS and each of the plurality of spread codes C1 to Ck, and among the calculated plurality of correlation values, specifies a spread code Cj (j is in integer satisfying $1 \leq j \leq k$) that provides a correlation value not lower than a threshold value.

Then, the despreading means 1623 despreads the spread spectrum signal SS with the specified spread code Cj. More specifically, the despreading means 1623 operates exclusive OR between the bit sequence of spread spectrum signal SS and the spread code Cj, whereby the spread spectrum signal SS is despread with spread code Cj.

Thereafter, the despreading means 1623 outputs the despread packet PKT to the register 19.

The spread code Cj used by the despreading means 1623 for despreading is represented differently from the spread code Ci used by the spreading means 1612 for spreading, because the spread code Ci used for spreading the packet PKT at the time of packet transmission is not always the same as the spread code Cj used for despreading the packet PKT at the time of packet reception.

Specifically, in the present invention, a radio apparatus A (any of the radio apparatuses 31 to 43) on the packet PKT transmitting side spreads the packet PKT using spread code Ci arbitrarily selected from the plurality of spread codes C1 to Ck, and therefore, when the radio apparatus A receives a packet PKT from another radio apparatus B (radio apparatus different from radio apparatus A), it may be the case that the radio apparatus B selects the same spread code as the spread code Ci from the plurality of spread codes C1 to Ck, or the radio apparatus B selects a different spread code different from the spread code Ci from the plurality of spread codes C1 to Ck. Because of this reason, the spread code Cj used by the despreading means 1623 for despreading is represented differently from the spread code Ci used by the spreading means 1612 for spreading.

Therefore, the spread codes Ci and Cj may be the same or different from each other.

The switching unit 163 includes a switch 1631 and terminals 1632 to 1634. The switch 1631 receives output data from the register 19 through the hop number setting means 20. The switch 1631 is connected to any of terminals 1632 to 1634 in accordance with a control signal CTL from the identifier 18.

The terminal 1632 is for outputting the output data from the register 19 to the upper layer of the radio apparatus; the terminal 1633 is for transmitting the output data from the register 19 to the upper layer of the radio apparatus and to another radio apparatus; and the terminal 1634 is for transmitting the output data from the register 19 to another radio apparatus.

In this manner, the switching unit 163 transmits the output data from the register 19 with the destination switched in accordance with the control signal CTL from the identifier 18.

The register 19 has a capacity that can hold, at one time, data of a bit length longer by $\alpha$ bits than the bit length of the header HD of a packet PKT, which will be described later. The $\alpha$ bit or bits are determined in accordance with the method of modulation, and it may have the bit length of 1 or 2 bits.

The capacity of the register 19 is set to "bit length of the header HD+$\alpha$" bits, in order to enable accurate detection of the header HD of packet PKT in each of the radio apparatuses 31 to 43, even if the header HD of packet PKT is stored with timing offset in the register 19 in each of the radio apparatuses 31 to 43.

The register 19 holds a packet PKT temporarily by a prescribed amount (="bit length of the header HD+$\alpha$" bits) from the head, and then, successively outputs the same, by a prescribed amount at a time, to the hop number setting means 20.

The identifier 18 holds a control table that indicates how to process the packet PKT received from other radio apparatus. With reference to the control table and the header HD held by the register 19, the identifier 18 determines the destination of the packet PKT in the manner as described later, and generates the control signal CTL for controlling the switching unit 163 such that the packet is transmitted to the determined destination. Then, the identifier 18 outputs the generated control signal CTL to the switch 1631 of the switching unit 163.

The hop number setting means 20 decrements the hop counter stored in the header HD of packet PKT output from the register 19 by "1", and outputs the decremented packet PKT to the switch 1631 of the switching unit 163.

Figure 4:
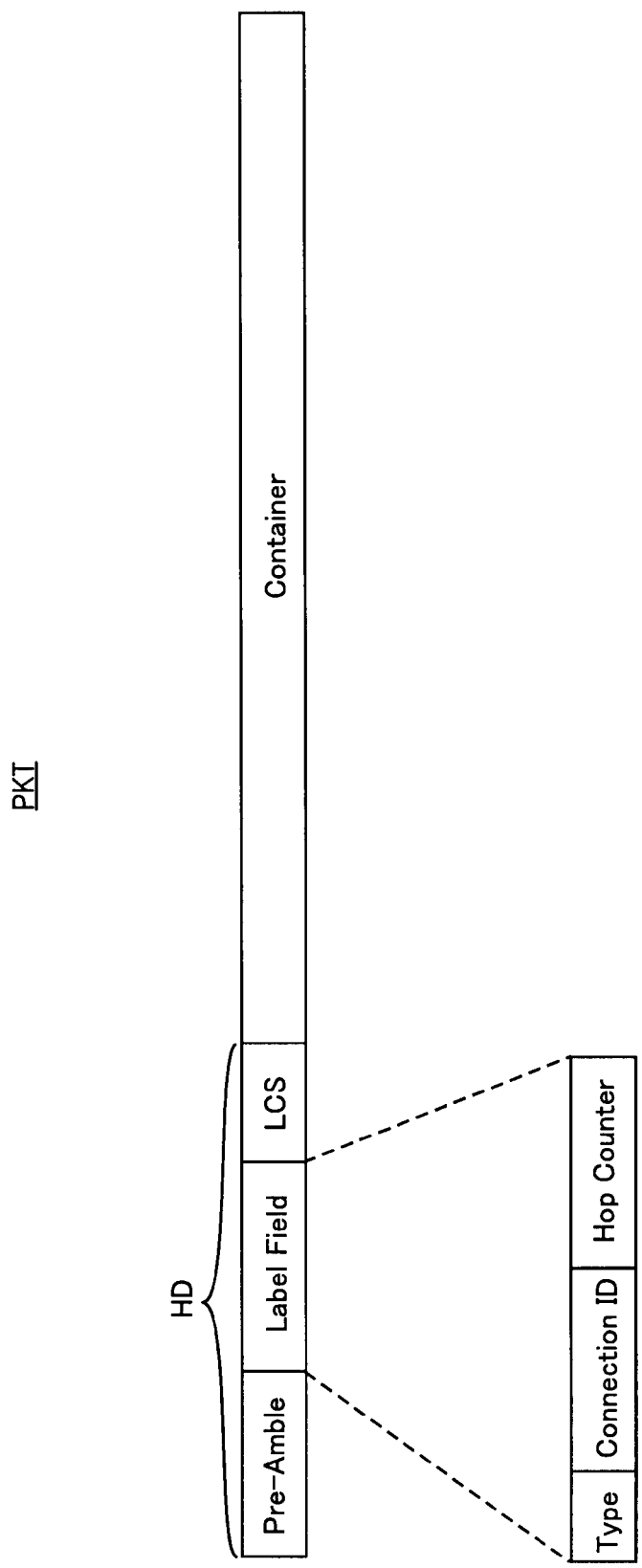
FIG. 4 shows a packet format.

FIG. 4 shows a configuration of a packet PKT. A packet PKT consists of a Pre-Amble, a Label Field, a Label Check Sequence (LCS) and a Container. The Pre-Amble, the Label Field and the LCS form the header HD.

The Pre-Amble stores a signal for reproducing the received signal. Specifically, a signal for carrier reproduction, or a signal for clock reproduction is stored in the Pre-Amble.

The Label Field stores label information for wireless communication of the packet along a wireless communication path, or label information for transmitting the packet PKT to an unspecified number of radio apparatuses in the wireless network system 100.

The Label Check Sequence (LCS) consists of CRC (Cyclic Redundancy Check) codes for error detection of the Label Field. The Container stores, by way of example, the IP packet.

The length of the Label Field and the length of the LCS are determined in accordance with the system. In the wireless network system 100 formed as an ad-hoc network, by way of example, the length of the Label Field is 12 bits and the length of the LCS is 4 bits.

The Label Field includes Type, Connection ID and Hop Counter. The Type is, for example, a 1-bit data, storing "0" or "1". Here, "0" represents a flooding label, which is label information for transmitting the packet PKT to an unspecified number of radio apparatuses in the wireless network system 100, and "1" represents a routing label, which is label information for relaying the packet PKT along the wireless communication path.

Therefore, by making reference to the Type, it is possible to know whether the packet PKT is to be transmitted to an unspecified number of radio apparatuses in the wireless network system 100 or to be relayed along the wireless communication path.

In the Type, "0" or "1" is stored by the radio apparatus which is the source.

The Connection ID consists of, for example, 7 bits of data, and stores a bit pattern of a fixed length. When a packet PKT is to be subjected to wireless communication along the wireless communication path, a bit pattern [1100110] is stored in the Connection ID. The bit pattern [1100110] is stored in the Connection ID when the wireless communication path for transmitting (or relaying) the packet PKT is set.

Further, when the packet PKT is to be transmitted to an unspecified number of radio apparatuses in the wireless network system 100, a numerical value larger than that stored in the past is stored in Connection ID. Here, the radio apparatus which is the source stores a numerical value larger than the numerical value used in the past, in the Connection ID.

The Hop Counter consists of, for example, 4 bits of data, and a prescribed numerical value is stored in the Hop Counter. Every time a packet PKT is relayed, the Hop Counter is decreased by "1", and when the numerical value stored in the Hop Counter reaches "0", the packet PKT is no longer relayed.

FIG. 5 shows the configuration of the control table held by the identifier 18 shown in FIG. 3. The control table CLT includes labels and commands. In control table CLT, "label" stores "Type", "Connection ID" and "Hop Counter" of FIG. 4, while "command" stores "Com1", "Com2", "Com3" and "Com4".

The command Com1 represents reception of the packet PKT transmitted from another radio apparatus by the radio apparatus of interest; the command Com2 represents transmission of the packet, PKT transmitted from another radio apparatus to an unspecified number of radio apparatuses in the wireless network system 100; the command Com3 represents relaying the packet PKT transmitted from another radio apparatus along the wireless communication path; and the command Com4 represents discarding the packet PKT transmitted from another radio apparatus.

The command Com1 corresponds to a label [1]/[1100110]/[arbitrary numerical value], [0]/[1111011]/[0000]; the command Com2 corresponds to a label [0]/[numerical value different from past numerical value]/[numerical value other than 0]; the command Com3 correspond to a label [1]/[1100110]/[numerical value other than 0]; and the command Com4 corresponds to a label error or a label [0]/[numerical value same as past numerical value]/[numerical value other than 0].

Label [1]/[1100110]/[arbitrary numerical value] includes "Type" of "1", and hence, it means transmission of the packet along the wireless communication path. Therefore, the identifier 18 of the destination performs reception process (=the command Com1) on a packet including the label [1]/[1100110]/[arbitrary numerical value]. Label [0]/[1111011]/[0000] includes "Type" of "0", and hence, it means transmission of the packet to an unspecified number of radio apparatuses. The Hop Counter, however, is [0000] and therefore, further transfer of the packet is impossible. Therefore, the identifiers 18 of the destination and of the relay perform reception process (=the command Com1) on a packet including the label [0]/[1111011]/[0000].

Label [0]/[numerical value different from past numerical value]/[numerical value other than 0] includes "Type" of "0", "Connection ID" of "numerical value different from past numerical value" and "Hop Count" of "numerical value other than 0", and hence, it means transmission of the packet to an unspecified number of radio apparatuses. Therefore, the identifiers 18 of the destination and of the relay perform flooding process (=the command Com2) on a packet including the label [0]/[numerical value different from past numerical value]/[numerical value other than 0].

Label [1]/[1100110]/[numerical value other than 0] includes "Type" of "1", and hence, it means transmission of the packet along the wireless communication path. Therefore, the identifier 18 of the relay performs a relay process (=the command Com3) on the packet including the label [1]/[1100110]/[numerical value other than 0].

When a label is erroneous, it is unknown how to process the packet PKT. Therefore, the identifiers 18 of the destination and of the relay perform a discard process (=the command Com4) on a packet including the erroneous label. Further, the label [0]/[numerical value same as past numerical value]/[numerical value other than 0] includes "Type" of "0" and hence, it means transmission of the packet PKT to an unspecified number of radio apparatuses. Connection ID, however, is "numerical value same as past numerical value," which means that the packet is the same as a packet already transmitted by flooding. Therefore, the identifiers 18 of the destination and of the relay perform the discard process (=the command Com4) on the packet including the label [0]/[numerical value same as past numerical value]/[numerical value other than 0].

When a packet PKT including any of the labels listed in the control table CLT of FIG. 5 is transmitted, it is the case that a wireless communication path has been established between the source and the destination, and therefore, the identifier 18 of each radio apparatus knows whether it is mounted on the source or on a relay. Therefore, the identifier 18 can determine the destination of the packet PKT simply by making reference to the control table CLT and to the header HD of the packet PKT in accordance with the method described later.

Figure 6A:
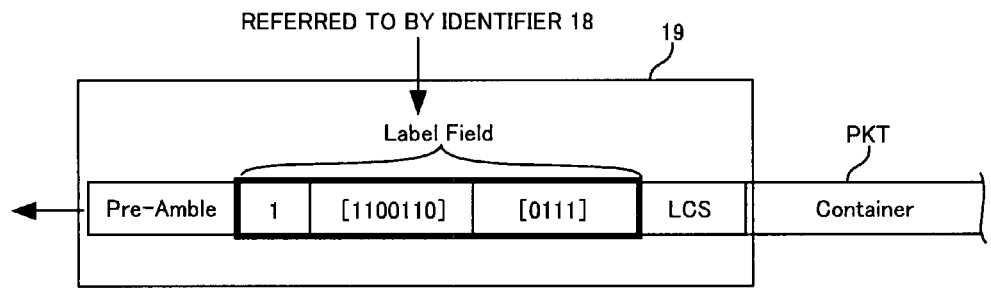
FIGS. 6A to 6C illustrate in detail the operation of the identifier shown in FIG. 3.
Figure 6B:
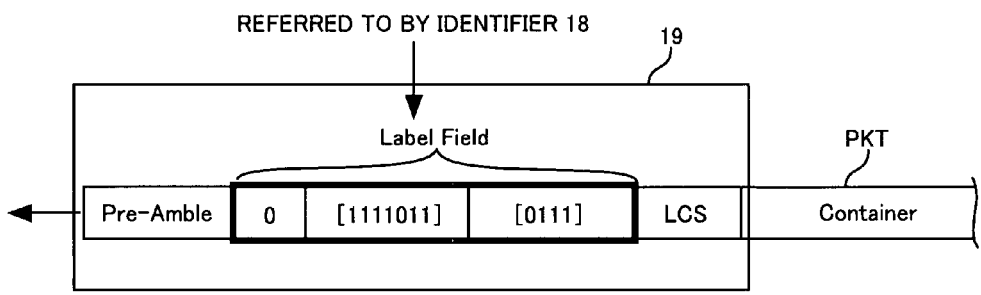
Figure 6C:
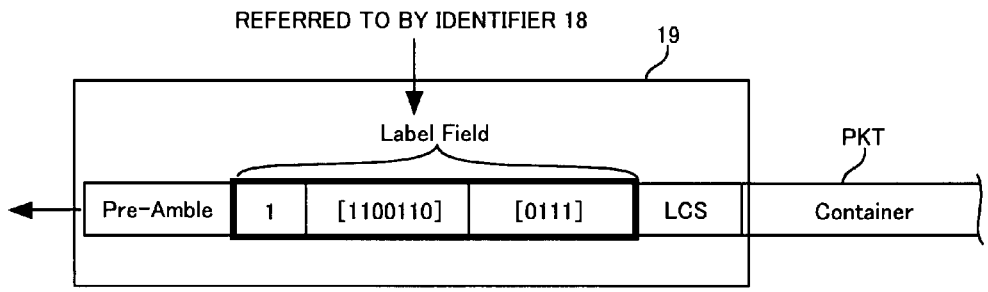

FIGS. 6A to 6C are illustrations showing in detail the operation of the identifier 18 shown in FIG. 3. FIG. 6A shows an example in which the Label Field of the packet PKT consists of the Type of "1", the Connection ID including numerical value [1100110] and the Hop Counter including numerical value [0111].

FIG. 6B shows an example in which the Label Field of the packet PKT consists of the Type of "0", the Connection ID including bit pattern [1111011] and the Hop Counter including numerical value [0111].

Further, FIG. 6C shows an example in which the Label Field of the packet PKT consists of the Type of "1", the Connection ID including bit pattern [1100110] and the Hop Counter storing numerical value [0111].

When the header HD of the packet PKT is stored in the register 19, the identifier 18 refers to the LCS of the header HD and determines whether the Label Field is erroneous or not. When the Label Field is erroneous (label error), the identifier 18 refers to control table CLT, and controls the register 19 such that the packet PKT is discarded.

When the Label Field is not erroneous, the identifier 18 refers to Type and Connection ID of the Label Field, and determines the destination of the packet PKT.

Specifically, in the example of FIG. 6A, the identifier 18 refers to "1" stored in the Type, and determines that the packet PKT is to be relayed along the wireless communication path, further refers to the bit pattern [1100110] stored in the Connection ID and determines, when the radio apparatus of interest is the destination, that the radio apparatus is the terminal radio apparatus. Specifically, the identifier 18 executes command Com1 based on the control table CLT. Then, the identifier 18 generates a control signal CTL1 (one type of control signal CTL) for controlling the switching unit 163 so that the packet PKT is transmitted to the upper layer of the radio apparatus, and outputs the generated control signal CLT1 to the switch 1631 of the switching unit 163.

In the example shown in FIG. 6B, the identifier 18 refers to "0" stored in the Type, and determines that the packet PKT is to be transmitted to an unspecified number of radio apparatuses in the wireless network system 100. The identifier 18 further refers to numerical value [1111011] stored in the Connection ID, and determines whether the numerical value [1111011] is the same as a numerical value stored in the Connection ID of a packet PKT that has been transferred in the past. When the numerical value [1111011] is the same as a numerical value used in the past, the identifier 18 determines that the packet PKT is a duplicate packet, and controls the register 19 so that the packet PKT is discarded. Specifically, the identifier 18 executes the command Com4 based on the control table CLT.

When the numerical value [1111011] is not the same as the numerical value used in the past, the identifier 18 determines that the radio apparatus of interest and also other radio apparatuses are destinations, so that it generates a control signal CTL2 (one type of control signal CTL) for controlling the switching unit 163 so that the packet PKT is transmitted to the upper layer of the radio apparatus of interest and also to other radio apparatuses, and outputs the generated signal to the switch 1631 of the switching unit 163. Specifically, the identifier 18 executes the command Com2 based on the control table CLT.

It is noted that the identifier 18 holds numerical values stored in the Connection ID of the packets PKT transferred in the past, for a prescribed time period.

Further, in the example shown in FIG. 6C, the identifier 18 refers to "1" stored in the Type, and determines that the packet PKT is to be relayed along the wireless communication path, further refers to the bit pattern [1100110] stored in the Connection ID and determines, when the radio apparatus of interest is a radio apparatus on the wireless communication path between the source and the destination, that the radio apparatus of interest is a relay. Then, the identifier 18 generates a control signal CTL3 (one type of control signal CTL) for controlling the switching unit 163 so that the packet PKT is transmitted to another radio apparatus, and outputs the generated control signal to the switch 1631 of the switching unit 163. Specifically, the identifier 18 executes the command Com3 based on the control table CLT.

The identifier 18 identifies the destination as described above while the header HD of the packet PKT is stored in the register 19. Specifically, the identifier 18 identifies the destination as described above, before the header HD of the packet PKT is output from the register 19.

Thus, it is possible to quickly determine the destination of the packet PKT, utilizing the time period in which the packet PKT passes through the register 19.

The relay and the destination that take part in the wireless communication performed along the wireless transmission path established using the OLSR protocol hold the control table CLT as described above, and therefore, a high-speed wireless communication path allowing high-speed packet transfer from the source to the destination along the wireless communication path is established. Here, "high-speed" means that the packet can be transferred at a rate faster than the transfer rate of the conventional ad-hoc network.

Next, an operation of wireless communication along the high-speed wireless communication path will be described.

Figure 7:
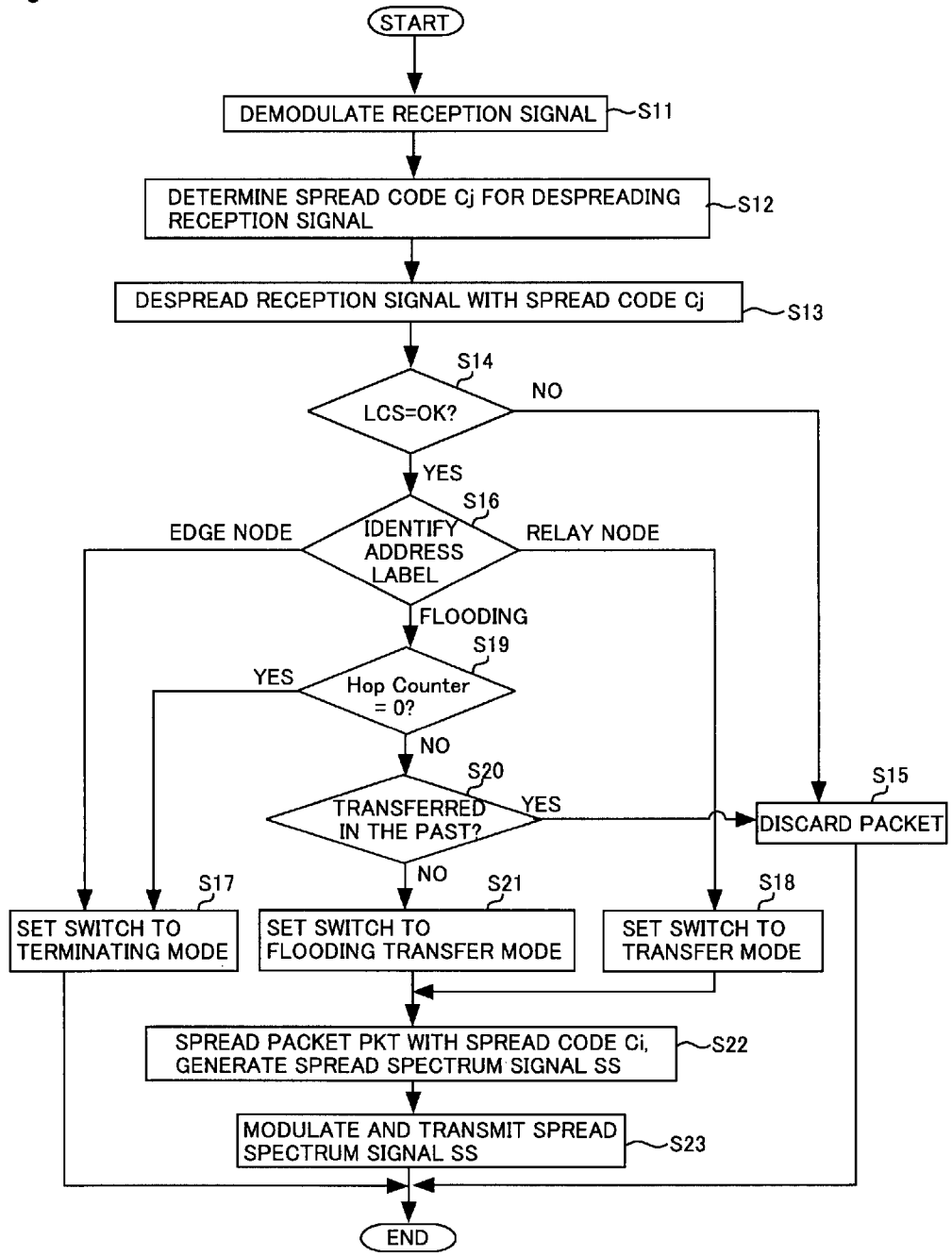
FIG. 7 is a flowchart representing the method of communication in accordance with an embodiment of the present invention.

FIG. 7 is a flowchart representing the method of communication in accordance with the embodiment of the present invention. In the description of FIG. 7, the method of communication of the radio apparatus 36 shown in FIG. 1 will be described. When a series of operations starts, the antenna 11 of the radio apparatus 36 receives a signal from the radio apparatus 32, and outputs the received reception signal R to the demodulator 1621 of the wireless interface module 16.

The demodulator 1621 demodulates reception signal R with a prescribed frequency (step S11), and outputs the demodulated spread spectrum signal SS to the despreading means 1623.

The despreading means 1623 receives the spread spectrum signal SS from the demodulator 1621, and receives the plurality of spread codes C1 to Ck from the spread code holding unit 1622. Then, the despreading means 1623 calculates correlation values between the spread spectrum signal SS and each of the plurality of spread codes C1 to Ck, and identifies the spread code Cj that provides the correlation value not lower than the threshold value, among the calculated plurality of correlation values. Specifically, the despreading means 1623 determines the spread code Cj for despreading the spread spectrum signal SS (step S12).

Then, the despreading means 1623 despreads the spread spectrum signal SS with the determined spread code Cj (step S13), and outputs the despread packet PKT to the register 19.

The register 19 holds the packet PKT (consisting of an information bit sequence) temporarily by a prescribed amount from the head, and then, successively outputs the same, by a prescribed amount at a time, to the hop number setting means 20.

While the header HD of the packet PKT is held in the register 19, the identifier 18 refers to the header HD and determines the destination of the packet PKT. Specifically, the identifier 18 refers to the LCS of the header HD, and determines whether there is any error in the Label Field of the header HD (step S14).

If the Label Field is erroneous ("NO" at step S14), the identifier 18 controls register 19 such that the packet PKT is discarded, and the register 19 discards the packet PKT (step S15).

At step S14, if the Label Field is free of any error ("YES" at step S14), the identifier 18 refers to the Type and the Connection ID of the header HD and identifies the address (destination) of the packet PKT in the manner as described above (step S16).

When the destination is identified to be the radio apparatus 36 (e.g., if the destination is identified to be the "edge node" at step S16), the identifier 18 generates the control signal CTL1 and outputs it to the switch 1631 of the switching unit 163. In response to the control signal CTL1, the switch 1631 is connected to the terminal 1632, and the packet PKT (consisting of the information bit sequence) output from the register 19 is output to the upper layer of the radio apparatus 36 of interest. Specifically, the switching unit 163 sets the switch 1631 to a terminating mode (step S17).

At step S16, when the identifier 18 identifies that the destination is the radio apparatus 39 adjacent to the radio apparatus 36 ("relay node" at step S16), the identifier 18 generates the control signal CTL3 and outputs it to the switch 1631 of the switching unit 163. In response to the control signal CTL3, the switch 1631 is connected to the terminal 1634, and outputs the packet PKT to the spreading means 1612 of the transmitting unit 161, so as to transmit the packet PKT (consisting of the information bit sequence) output from the register 19 to the radio apparatus 39. Specifically, the switching unit 163 sets the switch 1631 to a transfer mode (step S18).

Further, at step S16, when the identifier 18 identifies that the destination is an unspecified number of radio apparatuses in the wireless network system 100 ("flooding" at step S16), the identifier 18 further refers to the Hop Counter of the header HD to determine whether the Hop Counter is "0" or not (step S19).

When it is determined that the Hop Counter is "0", the series of operations proceeds to step S17 described above. When it is determined at step S19 that the Hop Counter is not "0", the identifier 18 refers to the numerical value stored in the Connection ID, to further determine whether the packet PKT has ever been transferred in the past or not (step S20). Specifically, when the numerical value stored in the Connection ID is the same as the numerical value stored in the Connection ID of a packet transferred in the past (the identifier 18 holds the numerical values for a prescribed time period), the identifier 18 determines that the packet PKT has been transferred in the past, and when the numerical value stored in the Connection ID is not the same as the numerical value stored in the Connection ID of packets transferred in the past, it determines that the packet PKT has not been transferred in the past.

When the packet PKT is one that has been transferred in the past, the series of operations proceeds to step S15 described above. When the packet PKT is not one that has been transferred in the past, the identifier 18 generates the control signal CTL2 and outputs it to the switch 1631 of the switching unit 163. In response to the control signal CTL2, the switch 1631 is connected to the terminal 1633, and the packet PKT (consisting of the information bit sequence) output from the register 19 is output to the upper layer and to the spreading means 1612 of the transmitting unit 161, so that the packet PKT is transmitted to an unspecified number of radio apparatuses in the wireless network system 100. Specifically, the switching unit 163 sets the switch 1631 to a flooding transfer mode (step S21).

After any of the above-described steps S17, S18 and S21, at the wireless interface module 16 of the radio apparatus 36, the spreading means 1612 of the transmitting unit 161 outputs a request for outputting the spread code Ci to the spread code holding unit 1611.

In response to the request for outputting the spread code Ci, the spread code holding unit 1611 arbitrarily selects the spread code Ci from the plurality of spread codes C1 to Ck, and outputs the selected spread code Ci to the spreading means 1612.

Then, the spreading means 1612 spreads the packet PKT (consisting of the information bit sequence) with the spread code Ci and generates the spread spectrum signal SS (step S22). Then, the spreading means 1612 outputs the spread spectrum signal SS to the modulator 1613.

The modulator 1613 modulates the spread spectrum signal SS received from the spreading means 1612 with a prescribed frequency, and transmits the modulated spread spectrum signal SS through the antenna 11 (step S23).

After any of steps S15, S17 and S23, the series of operations ends. Each of the radio apparatuses 31 to 35 and 37 to 43 also performs wireless communication in accordance with the flowchart shown in FIG. 7.

As described above, receiving a packet PKT from other radio apparatus 32, the radio apparatus 36 determines the destination of the packet PKT by making reference only to the header HD of the received packet PKT, and transmits the packet PKT to the determined destination. The determination of the destination is done utilizing the time period while the packet PKT passes through the register 19.

Therefore, as compared with an approach in which the destination is determined by making reference to a packet header PHD or the like stored in the body of the packet PKT, the destination of the packet PKT can be determined more quickly.

Further, determination of destination of the packet PKT and transmission of the packet PKT to the destination are performed by the identifier 18 provided in the data link layer and the wireless interface module 16 provided in the physical layer. Specifically, the packet PKT received from another radio apparatus is not transmitted to a layer higher than the data link layer but the destination of the packet PKT is determined by lower layers, that is, the data link layer and the physical layer, and the packet PKT is transmitted to the determined destination.

Therefore, communication delay in each of the radio apparatuses 31 to 43 can significantly be reduced.

Further, as the packet PKT is transmitted/received after spreading, simultaneous radio communication becomes possible among neighboring radio apparatuses within one to two hops, and by combining radio communication using the spread spectrum technique and the reception/relay of the packet PKT at the lower layer (data link layer) referring only to the header HD, communication delay at each of the radio apparatuses 31 to 43 can be reduced to be quite low.

Determination of the destination by making reference to "Type" and "Connection ID" stored in the header HD of the packet PKT corresponds to determination of the method of processing of the packet PKT by making reference to "Type" and "Connection ID" stored in the header HD of the packet PKT.

The reason is as follows. Determination that the destination of the packet PKT is the radio apparatus of interest by making reference to "Type" and "Connection ID" corresponds to reception of the packet PKT; determination that the destination of the packet PKT is a neighboring radio apparatus on the radio communication path by making reference to "Type" and "Connection ID" corresponds to relaying the packet PKT along the radio communication path; and determination that the destination of the packet PKT is an unspecified number of radio apparatuses in the wireless network system 100 by making reference to "Type" and "Connection ID" corresponds to reception and relaying of the packet PKT.

The Type/Connection ID/Hop Counter constitute the "label" indicating the processing contents of the packet PKT.

Figure 8:
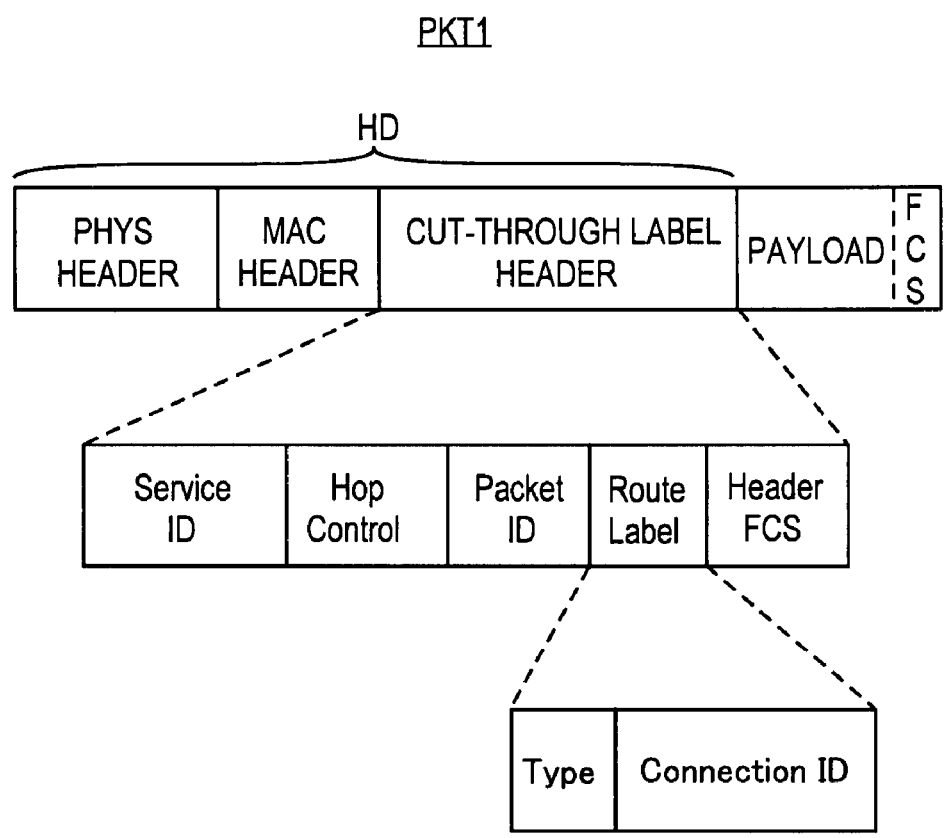
FIG. 8 shows another packet format.

FIG. 8 illustrates another configuration of the packet. A packet PKT1 consists of PHYSICAL (PHYS) HEADER, MAC HEADER, CUT-THROUGH LABEL HEADER, and PAYLOAD. PHYS HEADER, MAC HEADER, and CUT-THROUGH LABEL HEADER constitute the header HD.

PHYS HEADER includes a network identifier (ESS-ID: Enhanced Service Set ID) and communication rate.

MAC HEADER includes a packet sequence ID, MAC address of the source, and MAC address of the destination.

PAYLOAD is an area for storing data, and it includes FCS (Frame Check Sequence). FCS is used for detecting an error of the packet PKT1 or security of the packet PKT1.

CUT-THROUGH LABEL HEADER includes a service ID, Hop Control, Packet ID, Route Label and Header FCS.

Service ID represents the type of service, and designates the type of service that can be relayed between each of the radio apparatuses 31 to 43. The Hop Control includes maximum hop number and current hop number. When the current hop number reaches the maximum hop number, each of the radio apparatuses 31 to 43 does not relay the packet PKT1.

Packet ID is an ID for identifying each packet PKT1, which is given by the radio apparatus as the source. When the packet PKT1 has the same Packet ID as another, each of the radio apparatuses 31 to 43 regards the packet PKT1 as a duplicate packet and deletes the same.

Route Label is fixed length label information for performing high-speed label switching, and it consists of the Type and the Connection ID as described above. Header FCS consists of an MAC (Message Authentication Code) for security detection or the CRC code described above, for detecting an error of the header HD.

In the packet PKT1, by way of example, PHYS HEADER has the length of 15 to 24 bytes, MAC HEADER has the length of about 30 bytes, CUT-THROUGH LABEL HEADER has the length of about 30 bytes, and PAYLOAD has the length of about 100 bytes.

As a result, the packet PKT1 has the length of about 175 bytes to about 184 bytes.

Wireless communication using the packet PKT1 is performed in accordance with the flowchart shown in FIG. 7. Here, at step S14, based on the Header FCS, whether there is any error in the header HD of the packet PKT1 or not is determined.

At step S19, reference is made to the maximum hop number and the current hop number stored in the Hop Control, and when the current hop number reaches the maximum hop number, the series of operations proceeds to step S17, and when the current hop number does not yet reach the maximum hop number, the series of operations proceeds to step S20.

Further, at step S20, if the Packet ID is the same as the Packet ID of a packet that has been transferred in the past (the identifier 18 holds the Packet ID for a prescribed time period), it is determined that the packet PKT1 has been already transferred, and if the Packet ID is different from the Packet ID of packets transferred in the past, it is determined that the packet PKT1 has not yet been transferred.

Similar to the wireless communication using the packet PKT, in wireless communication using the packet PKT1, the delay in the wireless network system 100 as a whole can be reduced, as the delay in each of the radio apparatuses 31 to 43 is reduced.

Further, the identifier 18 constitutes the "processing contents determining means", and the switching unit 163 constitutes the "processing means."

Further, in the foregoing, the identifier 18 and the register 19 are described as being provided in the data link layer. It is not limiting and, in the present invention, the identifier 18 and the register 19 may be provided between the physical layer and the data link layer, and generally, they may be provided in a layer lower than the network layer.

Further, though the packets PKT and PKT1 have been described as transmitted/received after spreading, the present invention is not limited thereto, and the packets PKT and PKT1 may be transmitted/received without spreading.

Here, the transmitting unit 161 of the wireless interface module 16 is simply formed of the modulator 1613 with the spread code holding unit 1611 and the spreading means 1612 removed, and the packet PKT or PKT1 from the MAC module 17 or the switching unit 163 is input to the modulator 1613. Further, the receiving unit 162 is simply formed of the demodulator 1621 with the spread code holding unit 1622 and the despreading means 1623 removed, and the demodulator 1621 outputs the demodulated reception signal R to the register 19.

Here, the modulator 1613 and the demodulator 1621 modulate and demodulate with mutually different frequencies, respectively. Even when the packet PKT or PKT1 is transmitted/received without spreading, each of the radio apparatuses 31 to 43 determines reception, relaying and reception/relaying of the packet PKT or PKT1 only by making reference to the header HD of the packet PKT or PKT1, and processes the packet PKT or PKT1 based on the result of determination. Therefore, communication delay in each of the radio apparatuses 31 to 43 can be reduced. Further, the processing of packet PKT or PKT1 is performed at a lower layer, that is, the physical layer and the data link layer, and therefore, as compared with an approach in which the processing of packet PKT or PKT1 is determined at the layer higher than the data link layer, communication delay at each of the radio apparatuses 31 to 43 can be reduced.

In the foregoing, each of the radio apparatuses 31 to 43 has been described to perform wireless communication using the table-driven type protocol. The present invention is not limited thereto, and each of the radio apparatuses 31 to 43 may perform wireless communication by a method described above, using the on-demand type protocol.

Embodiment 2

Figure 9:
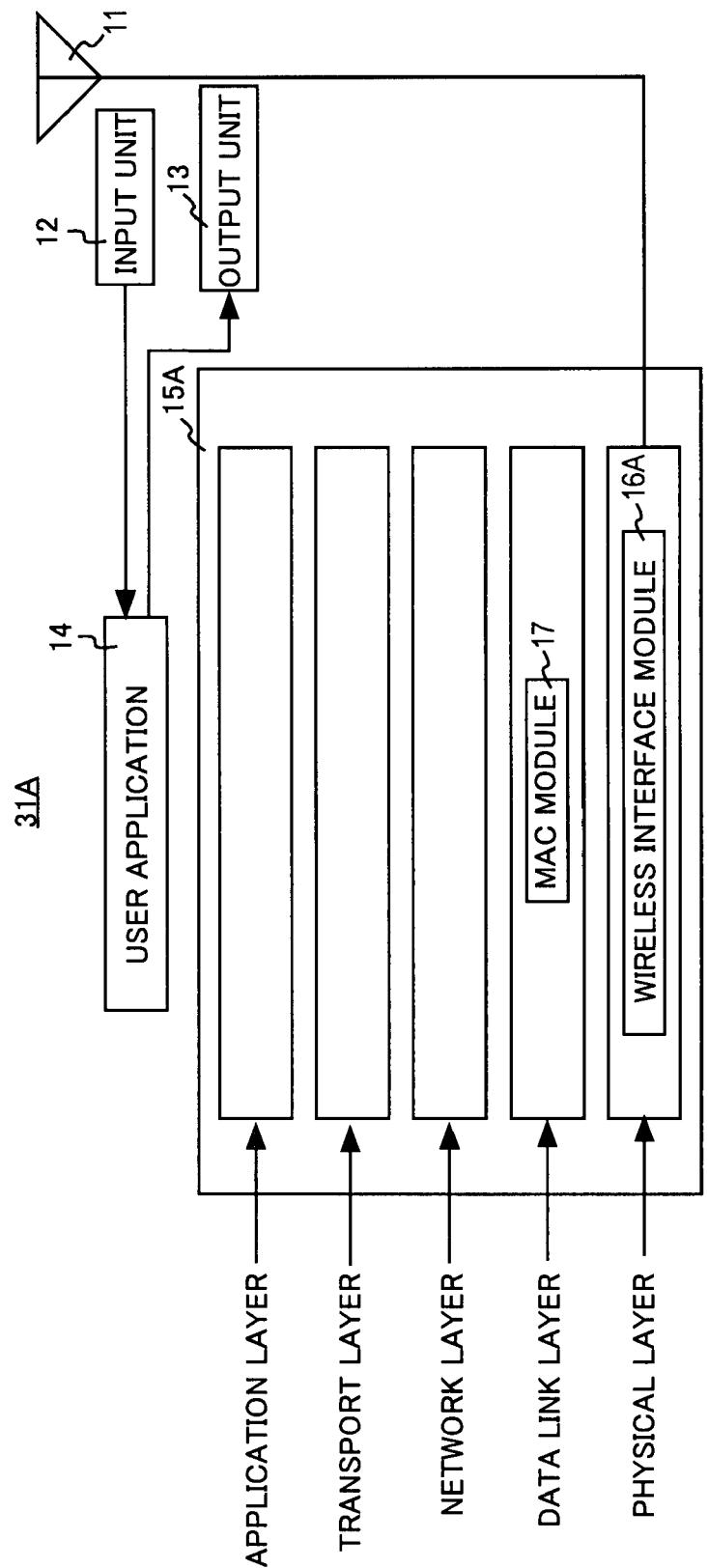
FIG. 9 is a schematic block diagram representing a configuration in accordance with Embodiment 2 of the radio apparatus shown in FIG. 1.

FIG. 9 is a schematic block diagram representing a configuration in accordance with Embodiment 2 of the radio apparatus 31 shown in FIG. 1. In Embodiment 2, each of the radio apparatuses 31 to 43 shown in FIG. 1 is implemented by a radio apparatus 31A shown in FIG. 9.

The radio apparatus 31A corresponds to the radio apparatus 31 shown in FIG. 2 with the communication control unit 15 replaced by a communication control unit 15A, and except for this point, it is the same as the radio apparatus 31. The communication control unit 15A is provided by removing the identifier 18, the register 19 and the hop number setting means 20 of the communication control unit 15 shown in FIG. 2 and by replacing the wireless interface module 16 by a wireless interface module 16A, and except for these points, it is the same as the communication control unit 15.

The wireless interface module 16A belongs to the physical layer, and holds a plurality of spread codes each consisting of different code sequences. The wireless interface module 16A spreads the transmission data (=packet) with a prescribed spread code arbitrarily selected from the plurality of spread codes.

Further, the wireless interface module 16A has a plurality of channels having mutually different frequencies, and selects a specific channel having relatively low inter-channel interference from the plurality of channels, by a method that will be described later. Then, the wireless interface module 16A transmits the spread spectrum signal, using the specific channel. Specifically, the wireless interface module 16A modulates the spread spectrum signal using the frequency of the specific channel, and transmits the modulated spread spectrum signal through the antenna 11.

Further, the wireless interface module 16A receives a signal transmitted from another radio apparatus through the antenna 11, demodulates the received signal, despreads the demodulated signal and outputs the result to the upper layer such as the network layer.

Figure 10:
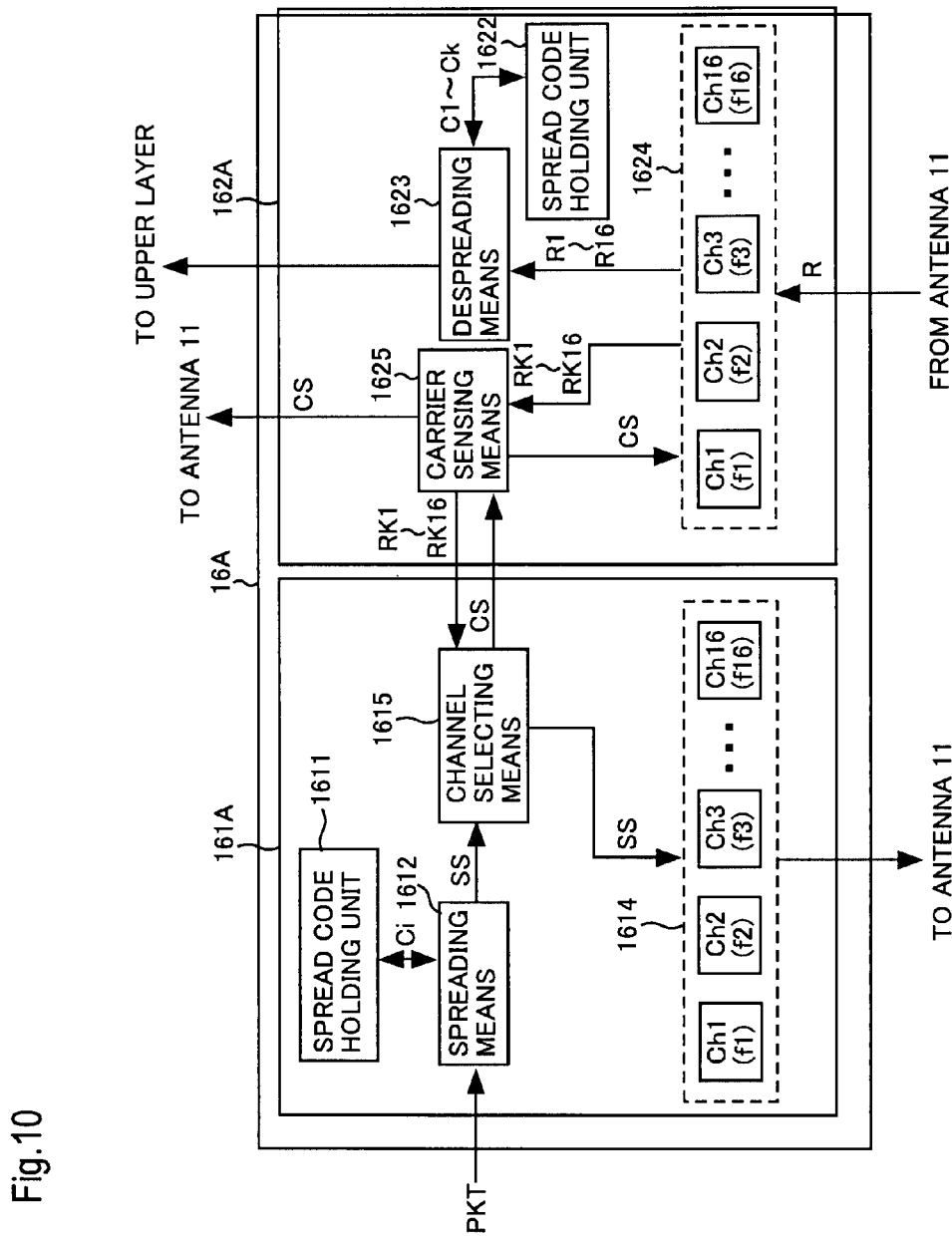
FIG. 10 shows a configuration of a part of the wireless interface module shown in FIG. 9.

FIG. 10 is a schematic diagram showing a configuration of a part of the wireless interface module 16A shown in FIG. 9. The wireless interface module 16A includes a transmitting unit 161A and a receiving unit 162A.

The transmitting unit 161A is formed by removing the modulator 1613 of the transmitting unit 161 shown in FIG. 3 and adding a channel unit 1614 and channel selecting means 1615, and except for these points, it is the same as the transmitting unit 161.

The channel unit 1614 includes 16 channels Ch1 to Ch16. The channels Ch1 to Ch16 modulate the spread spectrum signal SS with frequencies f1 to f16, respectively, and output the modulated spread spectrum signal SS to the antenna 11.

Receiving the spread spectrum signal SS from the spreading means 1612, the channel selecting means 1615 generates a carrier sense signal CS and outputs it to a carrier sensing means 1625 at the receiving unit 162A. After outputting the carrier sense signal CS, the channel selecting means 1615 receives reception signals RK1 to RK16 from the carrier sensing means 1625. Reception signals RK1 to RK16 are reception signals that are carrier-sensed at channels Ch1 to Ch16 of the channel unit 1614, respectively.

Receiving reception signals RK1 to RK16 from the carrier sensing means 1625, the channel selecting means 1615 performs Fast Fourier Transform (FFT) on each of the reception signals RK1 to RK16, to generate 16 reception signals RKF1 to RKF16. The channel selecting means 1613 extracts a reception signal RKF_MIN having the lowest signal level from the reception signals RKF1 to RKF16, and selects the channel (any of channels Ch1 to Ch16) that provides the reception signal RKF_MIN.

Then, the channel selecting means 1615 outputs the spread spectrum signal SS to the selected channel (any of the channels Ch1 to Ch16).

The receiving unit 162A is formed by removing the demodulator 1621 of the receiving unit 162 shown in FIG. 3 and adding a channel unit 1624 and the carrier sensing means 1625, and except for these points, it is the same as the receiving unit 162.

The channel unit 1624 receives the reception signal R or RK from the antenna 11, and receives the carrier sense signal CS from the carrier sensing means 1625. When carrier sensing is performed, the channel unit 1624 receives the reception signal RK from the antenna 11, and when carrier sensing is not performed, receives the reception signal R from the antenna 11.

The channel unit 1624 includes 16 channels Ch1 to Ch16. The channels Ch1 to Ch16 pass reception signals R1 to R16 (or reception signals RK1 to RK16) having frequencies f1 to f16, respectively, of the reception signal R (or reception signal RK). Specifically, the channels Ch1 to Ch16 demodulate the reception signal R (or reception signal RK) with the frequencies f1 to f16, respectively, to generate reception signals R1 to R16 (reception signals RK1 to RK16).

The channels Ch1 to Ch16 output the reception signals RK1 to RK16 to the carrier sensing means 1625, respectively, when they receive the carrier sense signal CS from the carrier sensing means 1625, and output the reception signals R1 to R16 to the despreading means 1623, respectively, when they do not receive the carrier sense signal CS from the carrier sensing means 1625.

Receiving the carrier sense signal CS from the channel selecting means 1615 of the transmitting unit 161A, the carrier sensing means 1625 outputs the received carrier sense signal CS to the antenna 11 and to the channel unit 1624. Receiving reception signals RK1 to RK16 from the channel unit 1624, the carrier sensing means 1625 outputs the received reception signals RK1 to RK16 to the channel selecting means 1615 of the transmitting unit 161A.

In Embodiment 2, the despreading means 1623 receives reception signals R1 to R16 (consisting of spread spectrum signal SS) from the channel unit 1621, and receives the plurality of spread codes C1 to Ck from the spread code holding unit 1623. Then, the despreading means 1624 calculates the values of correlations between the spread spectrum signal SS and each of the plurality of spread codes C1 to Ck, and identifies the spread code Cj (j is an integer satisfying $1 \leq j \leq k$) that provides the correlation value not lower than a threshold value.

Then, the despreading means 1623 despreads the spread spectrum signal SS using the identified spread code Cj. More specifically, the despreading means 1623 operates Exclusive-OR between the bit sequence of spread spectrum signal SS and the spread code Cj, and thereby despreads the spread spectrum signal SS with the spread code Cj.

The despreading means 1623 outputs the despread packet PKT to the upper layer.

The spread code Cj used by the despreading means 1623 for despreading is represented differently from the spread code Ci used by the spreading means 1612 for spreading, because the spread code Ci used for spreading the packet PKT at the time of packet transmission is not always the same as the spread code Cj used for despreading the packet PKT at the time of packet reception.

Specifically, in the present invention, a radio apparatus A (any of the radio apparatuses 31 to 43) on the packet PKT transmitting side spreads the packet PKT using spread code Ci arbitrarily selected from the plurality of spread codes C1 to Ck, and therefore, when the radio apparatus A receives the packet PKT from another radio apparatus B (radio apparatus different from radio apparatus A), it may be the case that the radio apparatus B selects the same spread code as the spread code Ci from the plurality of spread codes C1 to Ck, or the radio apparatus B selects a different spread code from the spread code Ci from the plurality of spread codes C1 to Ck. Because of this reason, the spread code Cj used by the despreading means 1623 for despreading is represented differently from the spread code Ci used by the spreading means 1612 for spreading.

Therefore, the spread codes Ci and Cj may be the same or different from each other.

Next, an operation of performing wireless communication along the wireless communication path established by using OLSR protocol will be described.

Figure 11:
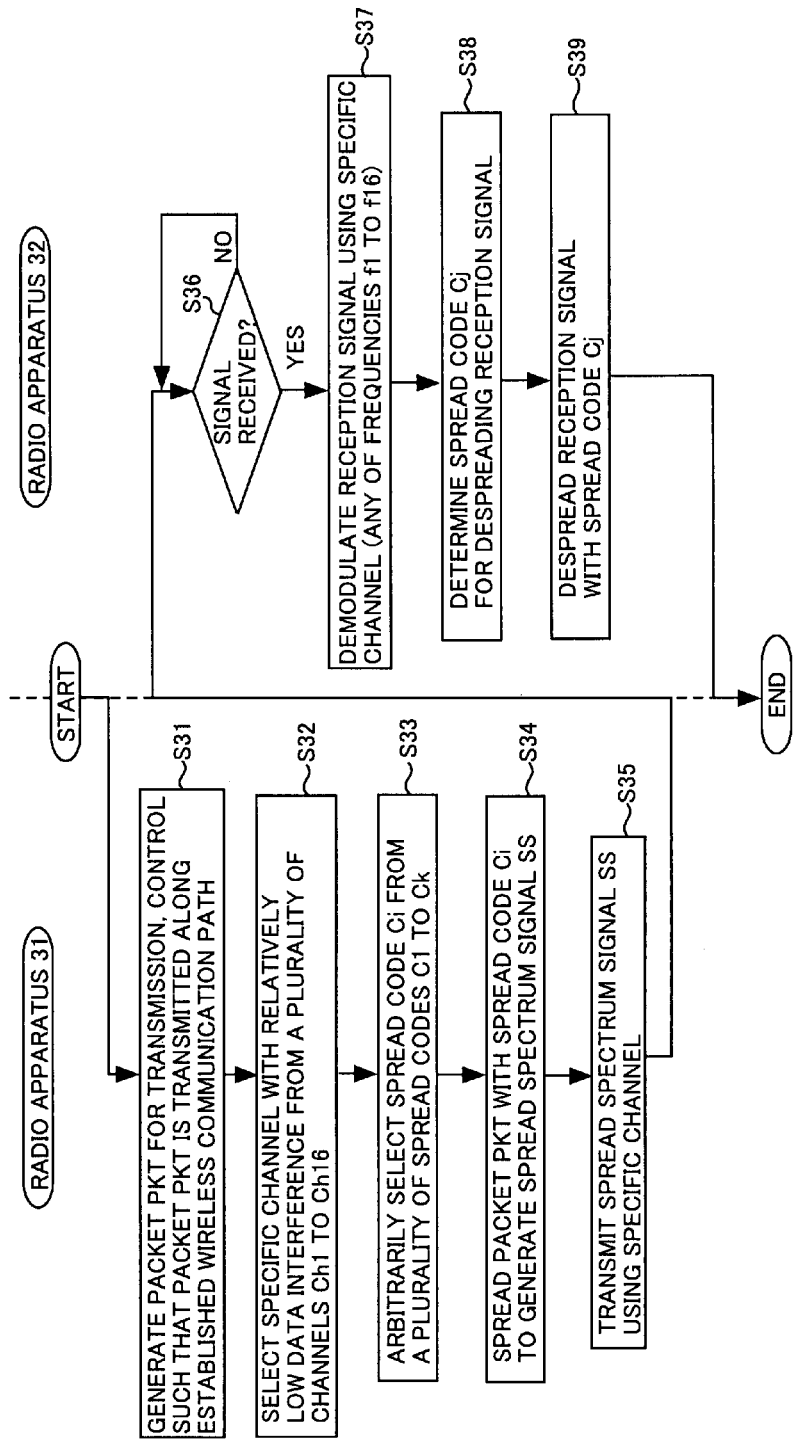
FIG. 11 is a flowchart representing the method of communication in accordance with Embodiment 2.

FIG. 11 is a flowchart representing a method of communication in accordance with Embodiment 2. With reference to FIG. 11, an example in which the radio apparatus 31 transmits the packet PKT to the radio apparatus 32 and the radio apparatus 32 receives the packet PKT from the radio apparatus 31 will be described.

When a series of operations starts, the upper layer of radio apparatus 31 generates the packet PKT for transmission, and controls such that the packet PKT is transmitted along an established wireless communication path (step S31).

Then, the MAC module 17 of the radio apparatus 31 outputs the packet PKT received from the upper layer to the wireless interface module 16A.

Then, at the wireless interface module 16A of the radio apparatus 31, the channel selecting means 1615 outputs the carrier sense signal CS to the carrier sensing means 1625 of the receiving unit 162A, and the carrier sensing means 1625 outputs the carrier sense signal CS from the channel selecting means 1615 to the antenna 11 and to the channel unit 1624.

In response to the carrier sense signal CS, the antenna 11 performs carrier-sensing, and outputs the reception signal RK received from the wireless communication space to the channel unit 1624 of the receiving unit 162A. The channels Ch1 to Ch16 of the channel unit 1624 demodulate the reception signal RK from the antenna 11 with frequencies f1 to f16, respectively, and generate reception signals RK1 to RK16.

In response to the carrier sense signal CS from the carrier sensing means 1625, the channels Ch1 to Ch16 output the reception signals RK1 to RK16 to the carrier sensing means 1625.

Then, the carrier sensing means 1625 outputs the reception signals RK1 to RK16 from the channel unit 1624 to the channel selecting means 1615 of the transmitting unit 161A.

The channel selecting means 1615 performs Fast Fourier Transform on each of reception signals RK1 to RK16 to generate reception signals RKF1 to RKF16, and detects a reception signal RKF_MIN having the lowest signal level from the generated reception signals RKF1 to RKF16. The channel selecting means 1615 selects the channel that provides the reception signal RFK_MIN as the specific channel.

Specifically, the channel selecting means 1615 selects a specific channel having relatively low inter-channel interference from the plurality of channels Ch1 to Ch16 (step S32).

Thereafter, the spreading means 1612 of the transmitting unit 161A receives the packet PKT from the MAC module 17, and outputs the request for outputting the spread code Ci to the spread code holding unit 1611.

In response to the request for outputting the spread code Ci, the spread code holding unit 1611 arbitrarily selects the spread code Ci from the plurality of spread codes C1 to Ck, and outputs the selected spread code Ci to the spreading means 1612 (step S33).

Then, the spreading means 1612 spreads the packet PKT using the spread code Ci, to generate the spread spectrum signal SS (step S34). Thereafter, the spreading means 1612 outputs the spread spectrum signal SS to the channel selecting means 1615.

Next, the channel selecting means 1615 outputs the spread spectrum signal SS to a specific channel (any of the channels Ch1 to Ch16) of the channel unit 1614, and the channel unit 1614 modulates the spread spectrum signal SS with the frequency (any of the frequencies f1 to f16) of the specific channel (any of the channels Ch1 to Ch16) and transmits the result (step S35).

Thereafter, the antenna 11 of the radio apparatus 32 receives the signal from the radio apparatus 31 (step S36), and outputs the received reception signal R to the receiving unit 162A of the wireless interface module 16A.

The channel unit 1624 of the receiving unit 162A demodulates the reception signal R by a channel (any of the channels Ch1 to Ch16) having the frequency (any of the frequencies f1 to f16) of the specific channel (step S37), and outputs the demodulated reception signal R (consisting of spread spectrum signal SS) to the despreading means 1623.

The despreading means 1623 receives reception signals R1 to R16 (consisting of spread spectrum signal SS) from the channel unit 1624, and receives the plurality of spread codes C1 to Ck from the spread code holding unit 1622. Then, the despreading means 1623 calculates the values of correlation between the spread spectrum signal SS and each of the plurality of spread codes C1 to Ck, and specifies the spread code Cj that provides the correlation value not lower than the threshold value, from the operated plurality of correlation values. Namely, the despreading means 1623 determines the spread code Cj for despreading the spread spectrum signal SS (step S38).

Then, the despreading means 1623 despreads the spread spectrum signal SS with the determined spread code Cj (step S39), and outputs the despread packet PKT to the upper layer.

The upper layer receives the reception signal consisting of despread bit sequence, and thus, the series of operations ends.

As described above, the present invention has the following characteristics: (A) the plurality of channels Ch1 to Ch16 are set in each of the radio apparatuses 31 to 43, (B) a specific channel having relatively low signal interference is selected from the plurality of channels Ch1 to Ch16, (C) the spread code Ci is arbitrarily selected from the plurality of spread codes C1 to Ck, and the packet PKT for transmission is spread by using the spread code Ci, and (D) the spread spectrum signal SS obtained by spreading the packet PKT is transmitted using the specific channel.

According to characteristic (A), the plurality of channels Ch1 to Ch16 are set, and using one frequency selected from the plurality of channels C1 to C16, the packet PKT is transmitted/received. As a result, it becomes possible for one radio apparatus and another radio apparatus adjacent thereto to transmit/receive simultaneously.

It is difficult, however, to allocate mutually different frequencies to the radio apparatuses 31 to 43 so that the radio apparatuses 31 to 43 in the wireless network system 100 can transmit/receive packets using mutually different frequencies. Particularly, in the wireless network system 100 in which each of the radio apparatuses 31 to 43 moves and forms a network in an autonomous manner, it is difficult to allocate mutually different frequencies to the radio apparatuses 31 to 43.

Therefore, according to characteristic (B), a specific channel having a relatively low signal interference is selected from the plurality of channels Ch1 to Ch16, and the packet PKT is transmitted using the selected specific channel.

Accordingly, it becomes possible for each of the radio apparatuses 31 to 43 to transmit the packet PKT using a frequency that is not used for wireless communication by other radio apparatuses, and hence, possibility of collision of the packet PKT in one radio apparatus can be made relatively lower. Further, even if a packet PKT collides in one radio apparatus, level of signal interference is low, and hence, communication quality can be ensured.

It is still expected that, even when the packet PKT is transmitted using the specific channel, packet collision may occur so that each radio apparatus cannot reproduce the desired wave and the delay is increased.

Therefore, in order to ensure that each radio apparatus can reproduce the desired wave even if a packet collision should occur, the packet PKT is spread by using the spread code Ci and the spread spectrum signal SS is transmitted using the specific channel, as characteristics (C) and (D).

By introducing these characteristics (A), (B), (C) and (D), simultaneous transmission/reception of packets PKT by one radio apparatus and another adjacent radio apparatus becomes possible while the communication quality is maintained, and even if the packet collision should occur, each radio apparatus can reproduce the desired wave.

As a result, even when a plurality of data flows are generated in the wireless network system 100, each data flow is almost free of any delay, and the delay of the wireless network system 100 as a whole can be made very low.

Performing Fast Fourier Transform (FFT) on each of the reception signals RK1 to RK16 received by carrier sensing in the wireless communication space and selecting a channel that provides the reception signal RKF_MIN having the lowest signal level among the reception signals RKF1 to RKF16 after Fast Fourier Transform correspond to selection of a channel having relatively low channel interference among the plurality of channels Ch1 to Ch16.

The reason for this is that the signal levels of reception signals RKF1 to RKF16 after Fast Fourier Transform represent the amount of signal interference.

The channel unit 1614 constitutes the "transmitting means."

Embodiment 3

Figure 12:
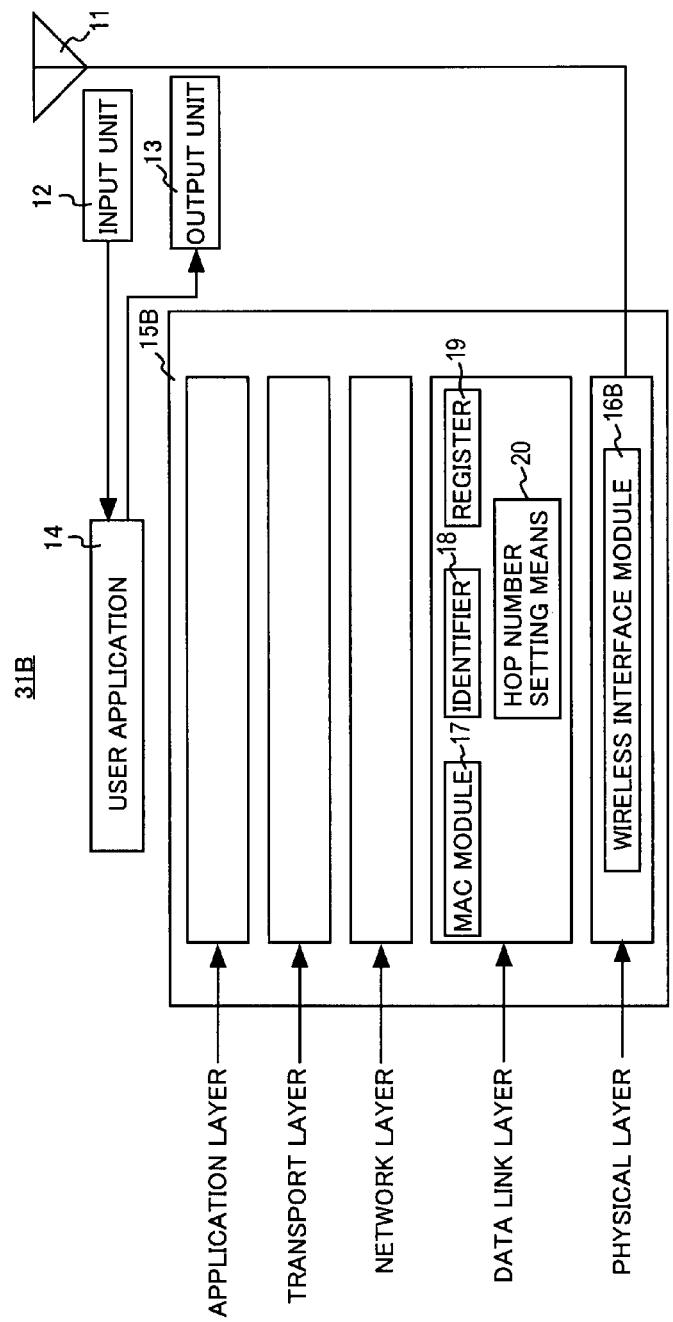
FIG. 12 is a schematic block diagram representing a configuration in accordance with Embodiment 3 of the radio apparatus shown in FIG. 1.

FIG. 12 is a schematic block diagram representing a configuration in accordance with Embodiment 3 of the radio apparatuses 31 to 43 shown in FIG. 1. In Embodiment 3, each of the radio apparatuses 31 to 43 shown in FIG. 1 is implemented by a radio apparatus 31B shown in FIG. 12.

The radio apparatus 31B is formed by replacing the communication control unit 15 of the radio apparatus 31 shown in FIG. 2 by a communication control unit 15B, and except for this point, it is the same as the radio apparatus 31. The communication control unit 15B is formed by replacing the wireless interface module 16 of the communication control unit 15 shown in FIG. 2 by a wireless interface module 16B, and except for this point, it is the same as the communication control unit 15.

The wireless interface module 16B demodulates a spread spectrum signal SS received by the radio apparatus 31B from another radio apparatus with a frequency of a specific channel, and further, despreads the signal with the spread code Cj, to generate the information bit sequence. Then, the wireless interface module 16B outputs the packet PKT1 consisting of the generated information bit sequence to the register 19.

Further, receiving the control signal CTL from the identifier 18, the wireless interface module 16B transmits the packet PKT1 (consisting of the information bit sequence) received from the hop number setting means 20 to an address designated by the control signal CTL.

The wireless interface module 16B has other functions that are the same as those of the wireless interface module 16A.

The register 19 belongs to the data link layer, and it temporarily holds the packet PKT1 received from the wireless interface module 16B and then outputs it to the hop number setting means 20.

The identifier 18 belongs to the data link layer and, in accordance with the method described above, determines a destination of the packet PKT1 referring only to the header of the packet PKT1 held by the register 19. The identifier 18 generates the control signal CTL for controlling the wireless interface module 16B such that the packet PKT1 is transmitted to the determined destination, and outputs the generated signal to the wireless interface module 16B.

The hop number setting means 20 decrements the Hop Counter included in the header of the packet PKT1 output from the register 19 by "1", and outputs the packet PKT1 to the wireless interface module 16B.

Figure 13:
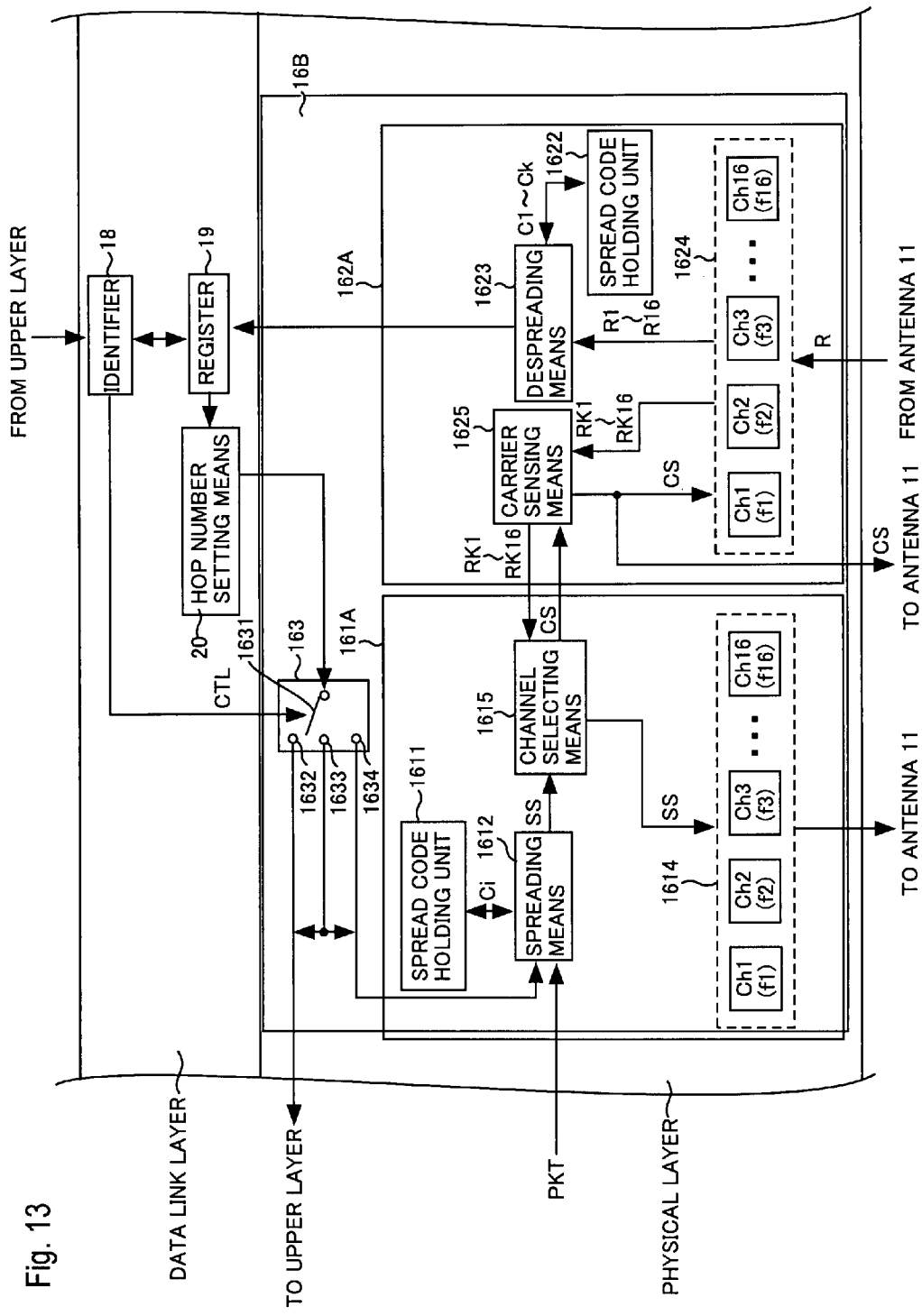
FIG. 13 shows relation among the wireless interface module, register and identifier shown in FIG. 12.

FIG. 13 shows relation between each of the wireless interface module 16B, the register 19 and the identifier 18 shown in FIG. 12. The wireless interface module 16B is formed by adding the switching unit 163 to the wireless interface module 16A shown in FIG. 10, and except for this point, it is the same as the wireless interface module 16A.

In Embodiment 3, the despreading means 1623 outputs the packet PKT1 generated by despreading, to the register 19.

The switching unit 163 is as described with reference to Embodiment 1.

The relay and the destination participating in the wireless communication along the wireless communication path established by using the OLSR protocol hold the control table CLT as described above and, as a result, a high-speed wireless communication path allowing high-speed transfer of a packet from the source to the destination along the wireless communication path is established. Here, "high-speed" means that the packet can be transferred at a rate faster than the transfer rate of the conventional ad-hoc network.

Next, an operation of performing wireless communication along the high-speed wireless communication path will be described.

Figure 14:
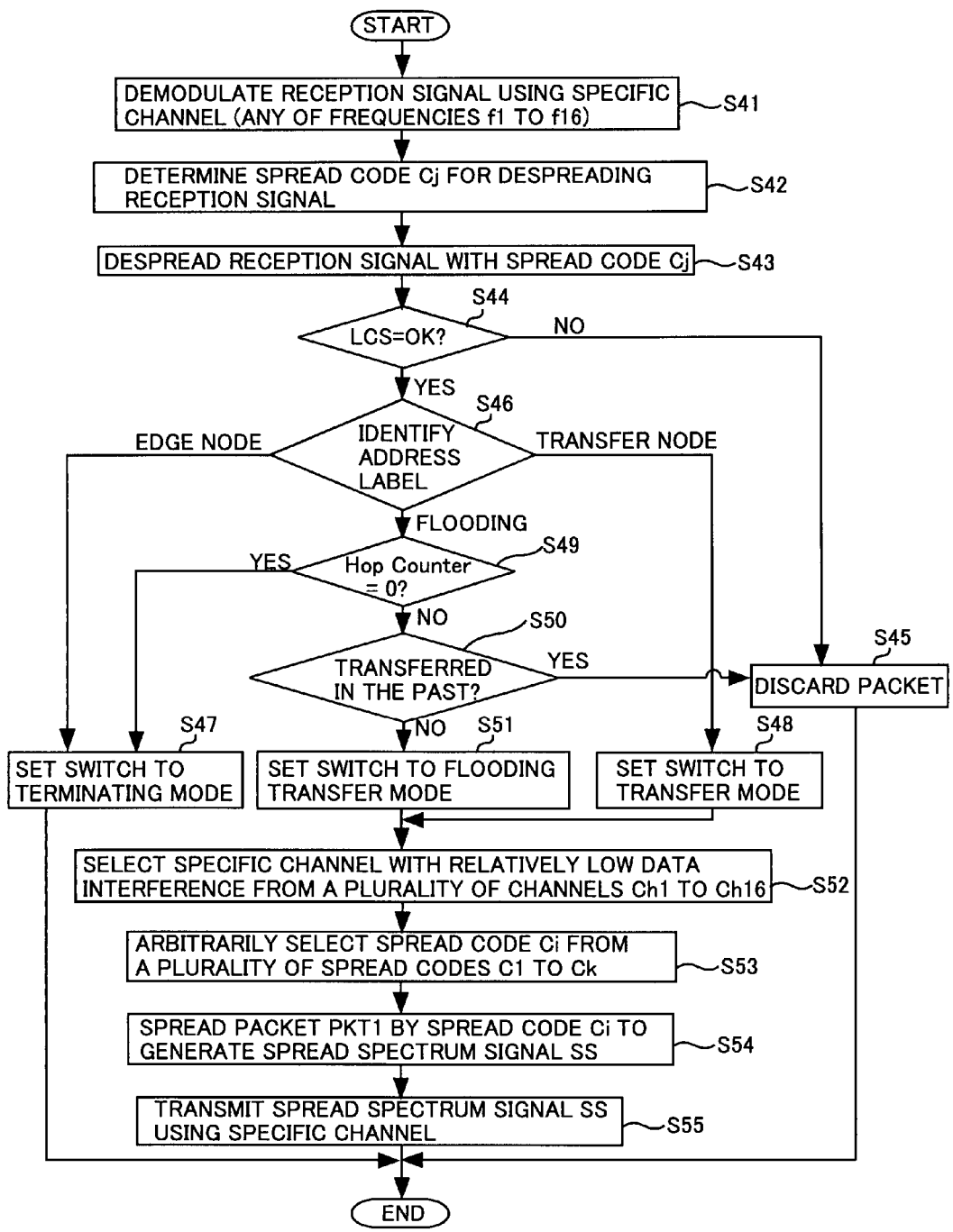
FIG. 14 is a flowchart representing the method of communication in accordance with Embodiment 3.

FIG. 14 is a flowchart representing a communication method in accordance with Embodiment 3. Referring to FIG. 14, the communication method performed by the radio apparatus 36 shown in FIG. 1 will be described. When a series of operations starts, the antenna 11 of the radio apparatus 36 receives a signal from the radio apparatus 32, and outputs the received reception signal R to the channel unit 1624 of the wireless interface module 16B.

The channel unit 1624 demodulates the reception signal R with a frequency (any of the frequencies f1 to f16) of a specific channel (any of the channels Ch1 to Ch16) (step S41), and outputs the demodulated reception signal Rx (any of the reception signals R1 to R16) to the despreading means 1623.

The despreading means 1623 receives the reception signal Rx, that is, the spread spectrum signal SS, from the channel unit 1624, and receives the plurality of spread codes C1 to Ck from the spread code holding unit 1622. Then, the despreading means 1623 calculates the values of correlation between the spread spectrum signal SS and each of the plurality of spread codes C1 to Ck, and identifies the spread code Cj that provides a correlation value not lower than the threshold value, among the operated plurality of correlation values. Specifically, the despreading means 1623 determines the spread code Cj for despreading the spread spectrum signal SS (step S42).

Then, the despreading means 1623 despreads the spread spectrum signal SS with the determined spread code Cj (step S43), and outputs the despread packet PKT1 to the register 19.

The register 19 holds the packet PKT1 (consisting of the information bit sequence) temporarily by a prescribed amount from the head, and then, successively outputs the same, by a prescribed amount at a time, to the hop number setting means 20.

While the header HD of the packet PKT1 is held in the register 19, the identifier 18 refers to the header HD and determines the destination of the packet PKT1. Specifically, the identifier 18 refers to the LCS of the header HD, and determines whether there is any error in the Label Field of the header HD (step S44).

If the Label Field is erroneous ("NO" at step S44), the identifier 18 controls the register 19 such that the packet PKT1 is discarded, and the register 19 discards the packet PKT1 (step S45).

At step S44, if the Label Field is free of any error ("YES" at step S44), the identifier 18 refers to the Type and the Connection ID of the header HD and identifies the address (destination) of the packet PKT1 (step S46) in the manner as described above.

When the destination is identified to be the radio apparatus 36 ("edge node" at step S46), the identifier 18 generates the control signal CTL1 and outputs it to the switch 1631 of the switching unit 163. In response to the control signal CTL1, the switch 1631 is connected to the terminal 1632, and the packet PKT1 (consisting of the information bit sequence) output from the register 19 is output to the upper layer of the radio apparatus 36 of interest. Specifically, the switching unit 163 sets the switch 1631 to a terminating mode (step S47).

At step S46, when the identifier 18 identifies that the destination is the radio apparatus 39 adjacent to the radio apparatus 36 ("transfer node" at step S46), the identifier 18 generates the control signal CTL3 and outputs it to the switch 1631 of the switching unit 163. In response to the control signal CTL3, the switch 1631 is connected to the terminal 1634, and outputs the packet PKT1 to the spreading means 1612 of the transmitting unit 161A, so as to transmit the packet PKT1 (consisting of the information bit sequence) output from the register 19 to the radio apparatus 39. Specifically, the switching unit 163 sets the switch 1631 to a transfer mode (step S48).

Further, at step S46, when the identifier 18 identifies that the destination is an unspecified number of radio apparatuses in the wireless network system 100 ("flooding" at step S46), the identifier 18 further refers to the Hop Counter of the header HD to determine whether the Hop Counter is "0" or not (step S49).

When it is determined that the Hop Counter is "0", the series of operations proceeds to step S47 described above. When it is determined at step S49 that the Hop Counter is not "0", the identifier 18 refers to the numerical value stored in the Connection ID, to further determine whether the packet PKT1 has ever been transferred in the past or not (step S50). Specifically, when the numerical value stored in the Connection ID is the same as a numerical value stored in the Connection ID of the packet transferred in the past (the identifier 18 holds the numerical values for a prescribed time period), the identifier 18 determines that the packet PKT1 has been transferred in the past, and when the numerical value stored in the Connection ID is not the same as the numerical value stored in the Connection ID of packets transferred in the past, it determines that the packet PKT1 has not been transferred in the past.

When the packet PKT1 is one that has been transferred in the past, the series of operations proceeds to step S45 described above. When the packet PKT1 is not one that has been transferred in the past, the identifier 18 generates the control signal CTL2 and outputs it to the switch 1631 of the switching unit 163. In response to the control signal CTL2, the switch 1631 is connected to the terminal 1633, and the packet PKT1 (consisting of the information bit sequence) output from the register 19 is output to the upper layer and to the despreading means 1612 of transmitting unit 161A, so that the packet PKT1 is transmitted to an unspecified number of radio apparatuses in the wireless network system 100. Specifically, the switching unit 163 sets the switch 1631 to the flooding transfer mode (step S51).

After any of the above-described steps S47, S48 and S51, in the wireless interface module 16B of the radio apparatus 36, the channel selecting means 1615 outputs the carrier sense signal CS to the carrier sensing means 1625 of the receiving unit 162A, and the carrier sensing means 1625 outputs the carrier sense signal CS from the channel selecting means 1615 to the antenna 11 and to the channel unit 1624.

In response to the carrier sense signal CS, the antenna 11 performs carrier-sensing, and outputs the reception signal RK received by carrier sensing to the channel unit 1624 of the receiving unit 162A. The channels Ch1 to Ch16 of the channel unit 1624 demodulate the reception signal RK from the antenna 11 with the frequencies f1 to f16, respectively, and generate the reception signals RK1 to RK16.

In response to the carrier sense signal CS from the carrier sensing means 1625, the channels Ch1 to Ch16 output the reception signals RK1 to RK16 to the carrier sensing means 1625.

Then, the carrier sensing means 1625 outputs the reception signals RK1 to RK16 from the channel unit 1624 to the channel selecting means 1615 of the transmitting unit 161A.

The channel selecting means 1615 performs Fast Fourier Transform on each of the reception signals RK1 to RK16 to generate the reception signals RKF1 to RKF16, and detects the reception signal RKF_MIN having the lowest signal level from the generated reception signals RKF1 to RKF16. The channel selecting means 1615 selects the channel that provides the reception signal RFK_MIN as the specific channel.

Specifically, the channel selecting means 1615 selects a specific channel having relatively low inter-channel interference from the plurality of channels Ch1 to Ch16 (step S52).

Thereafter, the spreading means 1612 outputs the request for outputting the spread code Ci to the spread code holding unit 1611. In response to the request for outputting the spread code Ci, the spread code holding unit 1611 arbitrarily selects the spread code Ci from the plurality of spread codes C1 to Ck, and outputs the selected spread code Ci to the spreading means 1612 (step S53).

Then, the spreading means 1612 spreads the packet PKT1 (consisting of the information bit sequence) using the spread code Ci, to generate the spread spectrum signal SS (step S54). Thereafter, the spreading means 1612 outputs the spread spectrum signal SS to the channel selecting means 1615.

Next, the channel selecting means 1615 outputs the spread spectrum signal SS to a specific channel of the channel unit 1614, and the channel unit 1614 modulates the spread spectrum signal SS with the frequency (any of the frequencies f1 to f16) of the specific channel (any of the channels Ch1 to Ch16), and transmits the modulated spread spectrum signal SS through the antenna 11 (step S55).

After any of the steps S45, S47 and S55, the series of operations ends. Each of the radio apparatuses 31 to 35 and 37 to 43 also performs wireless communication in accordance with the flowchart shown in FIG. 14.

As described above, receiving the packet PKT1 from other radio apparatus 32, the radio apparatus 36 determines the destination of the packet PKT1 by referring only to the header HD of the received packet PKT1, and transmits the packet PKT1 to the determined destination. The determination of the destination is done utilizing the time period while the packet PKT1 passes through the register 19.

Therefore, as compared with an approach in which the destination is determined by making reference to the packet header or the like stored in the body of the packet PKT1, the destination of the packet PKT1 can be determined more quickly.

Further, determination of destination of the packet PKT1 and transmission of the packet PKT1 to the destination are performed by the identifier 18 provided in the data link layer and the wireless interface module 16B provided in the physical layer. Specifically, the packet PKT1 received from another radio apparatus is not transmitted to the layer upper than the data link layer but the destination of the packet PKT1 is determined by lower layers, that is, the data link layer and the physical layer, and the packet PKT1 is transmitted to the determined destination.

Therefore, communication delay in each of the radio apparatuses 31 to 43 can significantly be reduced.

Further, as the packet PKT1 is spread to be transmitted/received using a specific channel having a relatively low signal interference, simultaneous radio communication becomes possible among neighboring radio apparatuses within one to two hops, and by combining radio communication using the spread spectrum technique and the reception/relay of the packet PKT at the lower layer (data link layer) referring only to the header HD, communication delay at each of the radio apparatuses 31 to 43 can be reduced to quite low.

Determination of the destination by making reference to "Type" and "Connection ID" stored in the header HD of the packet PKT1 corresponds to determination of contents to be processed of the packet PKT1 by making reference to "Type" and "Connection ID" stored in the header HD of the packet PKT1.

The reason is as follows. Determination that the destination of the packet PKT1 is the radio apparatus of interest by making reference to "Type" and "Connection ID" corresponds to reception of the packet PKT1, and determination that the destination of the packet PKT1 is the neighboring radio apparatus on the radio communication path by making reference to "Type" and "Connection ID" corresponds to relaying the packet PKT1 along the radio communication path, and determination that the destination of a packet PKT1 is an unspecified number of radio apparatuses in the wireless network system 100 by making reference to "Type" and "Connection ID" corresponds to reception and relaying of the packet PKT1.

The Type/Connection ID/Hop Counter constitute the "label" indicating the processing contents of the packet PKT1.

In Embodiment 3, wireless communication may be performed using the packet PKT1 (see FIG. 8) described above. The wireless communication using packet PKT1 is performed in accordance with the flowchart shown in FIG. 14. In this case, at step S44, whether the header HD of the packet PKT1 has any error or not is determined based on the Header FCS.

At step S49, reference is made to the maximum hop number and the current hop number stored in the Hop Control, and when the current hop number reaches the maximum hop number, the series of operations proceeds to step S47, and when the current hop number does not yet reach the maximum hop number, the series of operations proceeds to step S50.

Further, at step S50, if the Packet ID is the same as the Packet ID of the packet that has been transferred in the past (the identifier 18 holds the Packet ID for a prescribed time period), it is determined that the packet PKT1 has been already transferred, and if the Packet ID is different from the Packet ID of the packets transferred in the past, it is determined that the packet PKT1 has not yet been transferred.

Similar to the wireless communication using the packet PKT, in wireless communication using the packet PKT1, the delay in the wireless network system 100 as a whole can be reduced, as the delay in each of the radio apparatuses 31 to 43 is reduced.

As for the rest, the embodiment is the same as Embodiment 1.

In Embodiments 1 to 3 described above, the plurality of channels are represented by the 16 channels Ch1 to Ch16. The present invention is not limited thereto, and the plurality of channels may include 32 channels, or other number of channels.

Further, in Embodiments 1 to 3 described above, each of the radio apparatuses 31 to 43 has been described as performing wireless communication using the table-driven type protocol. The present invention is not limited thereto, and each of the radio apparatuses may perform wireless communication in accordance with the method described above, using the on-demand type protocol.

Further, the amount of signal interference described with reference to Embodiments 2 and 3 denotes any of (i) signal level after Fourier transform of the spread spectrum signal SS subjected to Fast Fourier Transform, (ii) signal level of spread spectrum signal SS, (iii) signal level after Fourier transform of the despread signal subjected to Fast Fourier Transform, (iv) signal level of the despread signal, (v) among a plurality of correlated values between the spread spectrum signal SS and each of the spread codes C1 to Ck, one that is lower than the threshold value, and (vi) among a plurality of correlated values between the signal after Fourier transform of the spread spectrum signal SS subjected to Fast Fourier Transform and each of the spread codes C1 to Ck, one that is lower than the threshold value.

Further, in Embodiments 2 and 3 described above, it has been described that a specific channel having relatively low signal interference is selected from the plurality of channels Ch1 to Ch16 and the selected specific channel is used for transmitting the spread spectrum signal SS. The present invention, however, is not limited thereto, and one channel selected from the plurality of channels Ch1 to Ch16 may be used for transmitting the spread spectrum signal SS.

Further, in Embodiment 1, reception and/or relaying of the packet with a reference only to the header of the packet, by the identifier 18, the register 19 and the hop number setting means 20 provided in the layer lower than the network layer has been described, and in Embodiments 2 and 3, spreading of the packet and transmission of the spread spectrum signal using a specific channel having the relatively low signal interference have been described. The radio apparatus in accordance with the present invention may include first packet processing means and/or second packet processing means, wherein the first packet processing means spreads the packet using a prescribed spread code arbitrarily selected from the plurality of spread codes and transmits the spread spectrum signal by the channel arbitrarily selected from the plurality of channels, and the second packet processing means receives and/or relays the packet referring only to the header of the transmitted packet.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A radio apparatus forming a wireless network established autonomously and performing wireless communication between a source and a destination, the radio apparatus comprising:
    a spreading unit configured to spread a packet with a prescribed spread code arbitrarily selected from a plurality of spread codes;
    a channel selecting unit configured to select one channel from a plurality of channels, in response to a request for transmitting said packet; and
    a transmitting unit configured to transmit a spread spectrum signal spread by said spreading unit, using said one channel, wherein:
    said channel selecting unit selects a specific channel having relatively low signal interference as said one channel from said plurality of channels in order to avoid the interference,
    said transmitting unit transmits said spread spectrum signal using said specific channel, and
    said signal interference is determined by one of the following (i) to (vi):
    (i) signal level after Fourier transform of the spread spectrum signal subjected to Fast Fourier Transform,
    (ii) signal level of the spread spectrum signal,
    (iii) signal level after Fourier transform of the despread signal subjected to Fast Fourier Transform,
    (iv) signal level of the despread signal, (v) among a plurality of correlated values between the spread spectrum signal and each of the plurality of spread codes, one that is lower than a threshold value, and (vi) among a plurality of correlated values between the signal after Fourier transform of the spread spectrum signal subjected to Fast Fourier Transform and each of the plurality of spread codes, one that is lower than the threshold value.

2. The radio apparatus according to claim 1, wherein said spreading unit spreads said packet with a different spread code, every time a new transmission of said packet occurs.

3. The radio apparatus according to claim 1, wherein said channel selecting unit performs Fast Fourier Transform on each signal of said plurality of channels, and selects a channel used for wireless communication of a signal having relatively low signal level among said plurality of signals subjected to Fast Fourier Transform as said one channel.

4. The radio apparatus according to claim 1, further comprising a packet processing unit configured to make reference only to a header of a transmitted packet in order to receive and/or relay said packet, wherein said packet processing unit includes:

a processing contents determining unit configured to determine, referring only to the header of the transmitted packet, which of a first process in which said packet is received, a second process in which said packet is relayed along a communication path between said source and said destination, and a third process in which said packet is relayed to an unspecified number of radio apparatuses, is to be performed, and a processing unit configured to perform any of said first to third processes, in accordance with a result of determination by said processing contents determining unit.

5. The radio apparatus according to claim 4, wherein said processing contents determining unit is provided in a layer lower than the network layer.

6. The radio apparatus according to claim 4 or 5, further comprising a holding unit having a capacity of data length longer by a predetermined length than packet's header length, temporarily holding, and then outputting to said processing unit, a packet, with length, beginning from the packet head, equal to the said data length, wherein said processing contents determining unit determines contents of processing of said packet with reference to a label stored in said header, while said header is held in said holding unit.

7. The radio apparatus according to claim 6, wherein said predetermined length is varied in accordance with a method of modulating said packet.

8. The radio apparatus according to claim 6, wherein:
said label includes first and second bit patterns, and
said processing contents determining unit determines to perform either said first process or said second process in accordance with a relation between the radio apparatus and said destination when said label includes said first bit pattern, and determines to perform said third process when said label includes said second bit pattern.

9. The radio apparatus according to claim 8, wherein said processing contents determining unit determines to perform said first process when the radio apparatus is said destination and said label includes said first bit pattern, and determines to perform said second process when the radio apparatus is a radio apparatus on said communication path and said label includes said first bit pattern.

10. The radio apparatus according to claim 8, wherein:
said first bit pattern has a first bit sequence indicating wireless communication of said packet along said communication path and a second bit sequence provided continuous to said first bit sequence,
said second bit pattern has a third bit sequence having the same bit length as said first bit sequence and indicating wireless communication of said packet to a plurality of radio apparatuses in said wireless network, and a fourth bit sequence provided continuous to said third bit sequence and having the same bit length as said second bit sequence, and
said processing contents determining unit determines to perform said third process when said label includes said second bit pattern and a numerical value represented by said fourth bit sequence is larger than a numerical value used in the past.

11. The radio apparatus according to claim 8, wherein:
said first bit pattern is set when said communication path is determined, and
said second bit pattern is set by said source.

* * * * *